United States Patent [19]
Tang

[11] Patent Number: 5,841,262
[45] Date of Patent: Nov. 24, 1998

[54] LOW-COST UNIVERSAL DRIVE FOR USE WITH SWITCHED RELUCTANCE MACHINES

[75] Inventor: Yifan Tang, St. Louis, Mo.

[73] Assignee: Emerson Electric Co., St. Louis, Mo.

[21] Appl. No.: 826,313

[22] Filed: Mar. 25, 1997

[51] Int. Cl.$^6$ ..................................................... H02F 8/00
[52] U.S. Cl. .......................... 318/701; 318/696; 318/715; 318/721
[58] Field of Search .................................. 318/701–832; 364/140–170, 474.01–474.32

[56] References Cited

U.S. PATENT DOCUMENTS

| | | | |
|---|---|---|---|
| 3,864,557 | 2/1975 | Sindelar | 318/571 |
| 3,878,372 | 4/1975 | Sindelar | 318/571 |
| 4,283,634 | 8/1981 | Yannone et al. | 290/40 R |
| 5,028,852 | 7/1991 | Dunfield | 318/254 |
| 5,469,039 | 11/1995 | Stephenson et al. | 318/701 |
| 5,545,964 | 8/1996 | Stephenson et al. | 318/701 |
| 5,563,488 | 10/1996 | Stephenson et al. | 318/701 |
| 5,652,494 | 7/1997 | Sugden | 318/701 |

OTHER PUBLICATIONS

Ehsani et al., "Direct Control Strategies Based on Sensing Inductance in Switched Reluctance Motors," *IEEE Transactions on Power Electronics*, vol. 11, No. 1, pp. 74–82 (1996).

Kjaer et al., "A New Energy Optimizing Control Strategy for Switched Reluctance Motors," *IEEE Transactions on Industry Applications*, vol. 31, No. 5, pp. 1088–1095 (1995).

Kjaer et al., "A New Energy Optimizing Control Strategy for Switched Reluctance Motors," APEC '94—9th Annual Applied Power Electronics Conference, (Feb. 1994), in *IEEE*, vol. 1, pp. 48–55 (1994).

Kjaer et al., "High Grade Control of Switched Reluctance Machines," 1996 IEEE Industry Applications Conference, Thirty–First IAS Annual Meeting, (Oct. 6–10, 1996), in *IEEE*, vol. 1, pp. 92–100 (1996).

Rochford et al., "Development of Smooth Torque in Switched Reluctance Motors Using Self–Learning Techniques," Fifth European Conference on Power Electronics and Applications, (Sep. 13–16, 1993), in *IEEE*, vol., 6, pp. 14–19 (1993).

O'Donovan et al., "Neural Network Based Torque Ripple Minimization in a Switched Reluctance Motor," Proceedings of IECON '94—20th Annual Conference of IEEE Industrial Electronics, (Sep. 5–9, 1994), in *IEEE*, vol. 2, pp. 1226–1231 (1994).

Kavanagh et al., "Torque Ripple Minimization in Switched Reluctance Drives using Self–Learning Techniques," 1991 International Conference on Industrial Electronics, Control and Instrumentation, (Oct. 28–Nov. 1, 1991), in *IEEE*, vol. 1, pp. 289–294 (1991).

Tandon et al., "Self–Tuning Control of a Switched Reluctance Motor Drive with Shaft Position Sensor," 1996 IEEE Industry Applications Conference, Thirty–First IAS Annual Meeting. (Oct. 6–10, 1996), in *IEEE*, vol. 1, pp. 101–108 (1996).

*Primary Examiner*—Paul Ip
*Attorney, Agent, or Firm*—Arnold, White & Durkee

[57] ABSTRACT

A universal drive for a switched reluctance machine the drive obtaining a desired speed, the drive comprising means for automatically forming a magnetization table, said table containing information relating the magnetic flux, current, and rotor angle of said switched reluctance machine; means for automatically forming a rule table, the rule table containing information relating the torque of the SRM to turn-on and turn-off angles; sensors for sensing the dc bus voltage and currents of the phases of the machine; means for estimating a reference angle using information in the magnetization table and the sensed dc bus voltage and phase currents; means for obtaining the turn-on and turn-off angles from the self-tuned table based upon the desired speed; and means for turning the phase currents of the machine on at the turn-on angle in relation to the reference angle and turning the phase current off at the turn-off angle in relation to the reference angle.

17 Claims, 17 Drawing Sheets

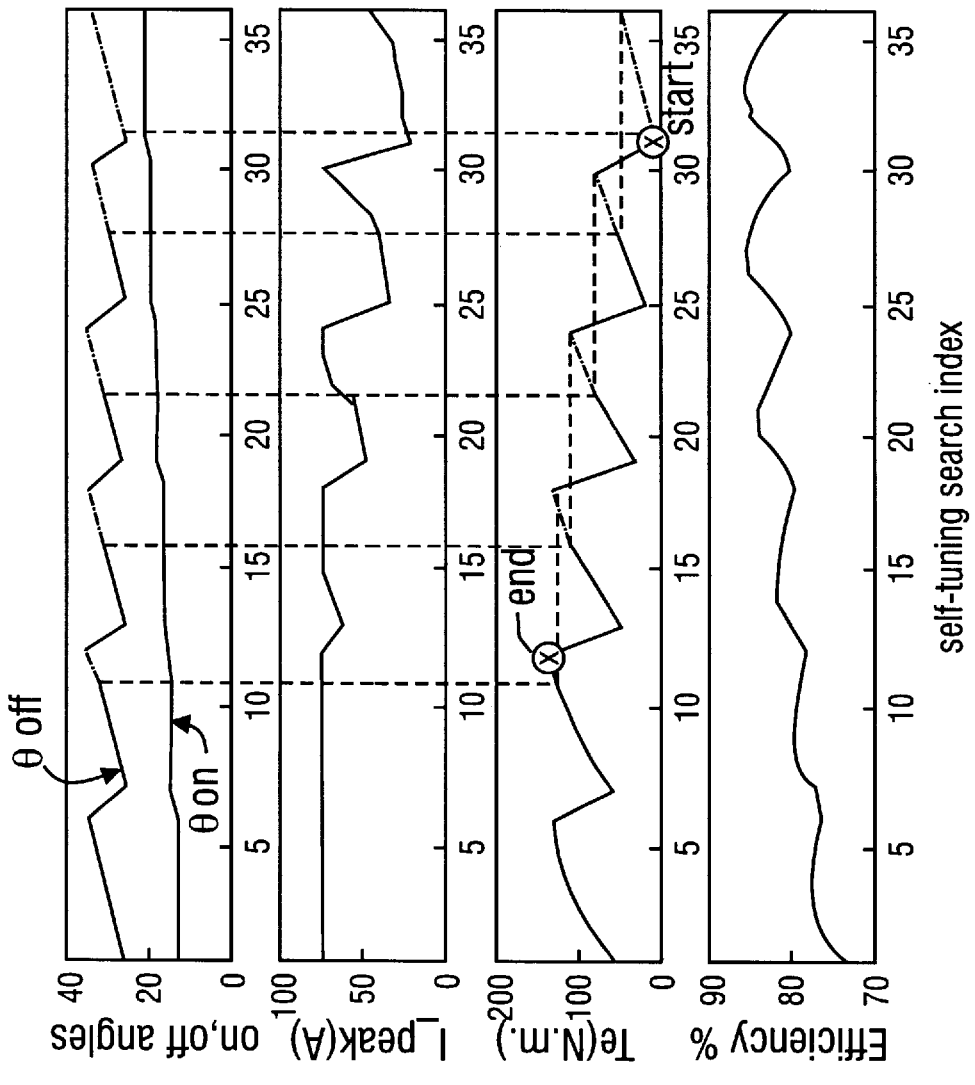

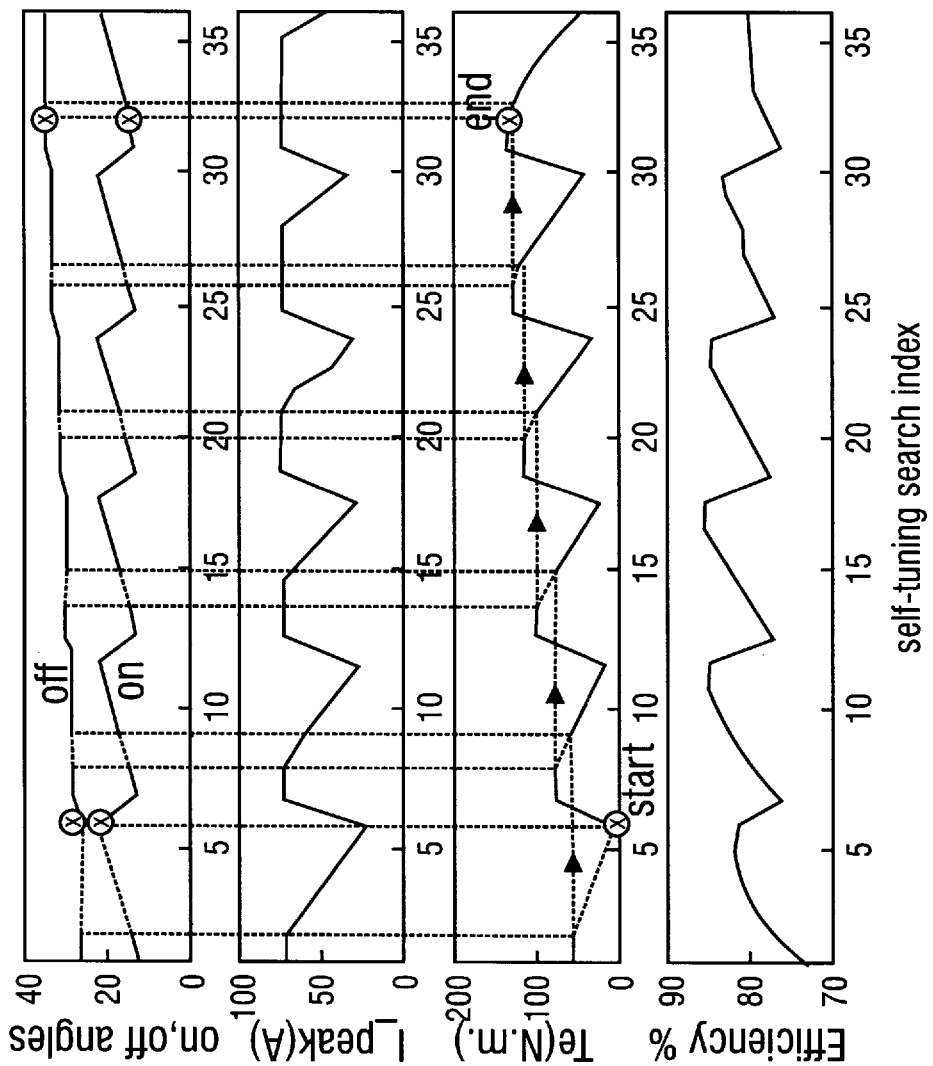

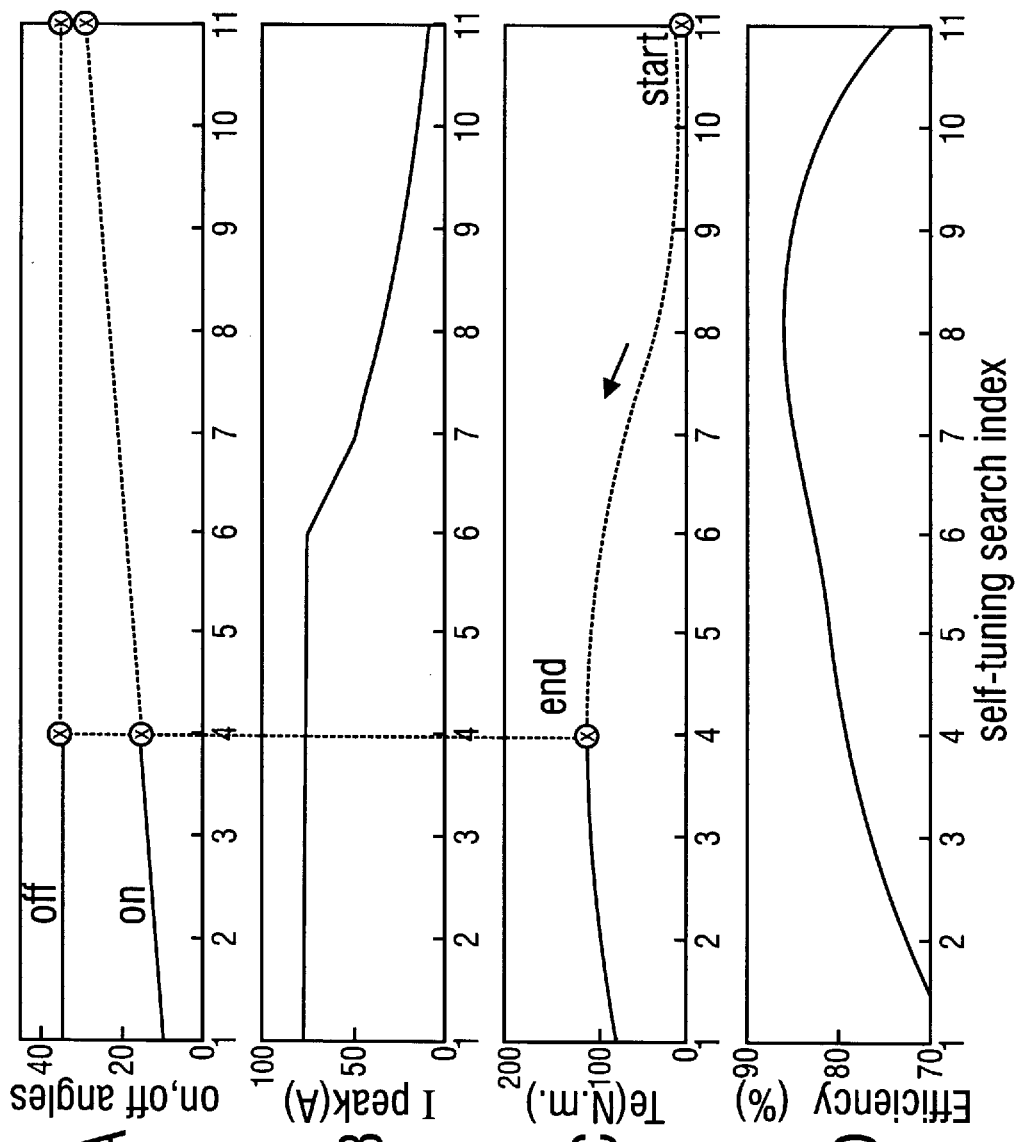

LOW-COST UNIVERSAL DRIVE FOR USE WITH SWITCHED RELUCTANCE MACHINES

FIELD OF THE INVENTION

The invention relates to universal drives to use with switched reluctance machines. Specifically, it relates to drives for switched reluctance machines that can be interchanged between different SRM machines.

BACKGROUND OF THE INVENTION

In a switched reluctance machine (SRM), electrical currents are switched on and off (at "turn-on" and "turn-off" angles) consecutively in each phase winding of the machine to maintain constant rotor rotation. Mathematical models of the operation for the SRM, which are essential for the design of the machine's control drive, are difficult to accurately obtain when the SRM's non-linear magnetic field structure and saturation, iron losses, double saliency in the air gaps, flux leakage, current dependent back-EMF, and phase mutual coupling are taken into account.

Lacking a mathematically-based control approach like those available for other types of machines, the control drive of the SRM is usually constructed using laboratory-based empirical characterization techniques. These techniques are designed to utilize the machine's torque-speed capability and often to also maximize the efficiency of the machine. For example, in one approach, the control parameters of the machine are selected and tested in the laboratory under all possible torque and speed operating points within the machine's and drive's rating limits. A look-up table is created relating the appropriate control parameters to the operating points. However, this type of control drive is expensive and time-consuming to create; additionally, this type of control drive is highly sensitive to machine parameter variations, electrical drift, electrical noise and load dynamics.

Other types of on-line SRM control drives have also appeared in recent years. For example, a control drive has been proposed that adjusts a phase's turn-on angle on-line, minimizing the measured dc-link power flow (i.e., the dc-link current with a nearly constant voltage) for a certain torque and speed operating point. Initial turn-on and turn-off angles are empirically calculated based on the speed ranges, and the duty cycle of the dc link voltage is varied on-line to reach the desired speed. The turn-on angle is then perturbed to determine if the power flow decreases. Based on the results of this perturbation, the turn-on angle is shifted until the power flow reaches its minimum; the duty cycle is also varied to maintain the desired speed. At the end of this procedure, an optimal combination of turn-on angle and duty cycle is obtained for a particular torque and speed operating point.

In another type of control drive, magnetization curves (i.e. data relating flux-linkage, current, and rotor position) are approximated with polynomials, where the coefficients of the polynomials are self-learned off-line with the SRM at a standstill by measuring the winding voltages and currents at known rotor positions. A torque/current/position look-up table is created through self-learning from the static and dynamic tests, and the look-up table is used for on-line instantaneous current control to obtain smooth torque. In another control drive, torque sharing functions are used to coordinate the phase current to minimize the torque ripples where these precalculated current shapes are stored in memory for the various cases.

In the above cases, the main purpose of the control drive is to reduce the torque ripples in the machine by adjusting the current waveforms through stored pre-calculated or tested characterization, or to self-tune only part of the several control variables through measurement feedback such as the dc link current. Since obtaining high machine performance is the objective for such self-tuning methods, the drive system is specific to the machine, complex, and expensive to create. Also, the drive and the specific machine to be controlled are inseparable in the above systems. The non-interchangeably of the drives severely limits the market appeal of SRM machines.

As a consequence of the non-interchangeably of the drives, the SRM machine and drive must be bought as a pair, further limiting the market appeal of the SRM drives and SRMs. The drive electronics in a typical SRM drive need tedious hardware characterization to adopt the drive to a specific machine. As mentioned above, this expensive and time-consuming procedure must often take place in a laboratory which utilizes expensive special test equipment.

Typical SRM drives must also use a rotor position sensing device which adds cost and creates reliability concerns due to temperature variations, faults, drifting, and electrical interference. The addition of the sensor requires space, adds to power consumption, and requires periodic sensor adjustment and characterization procedures to be used.

Traditional SRM drives are also costly to design and produce and inflexible to modifications because they are usually constructed from analog components or application-specific integrated circuits (ASIC) that are hard-wired together. It is preferable to have a SRM drive that uses inexpensive microcontrollers and memory. The development of software-based systems is less costly since modifications and improvements can be accomplished easily in software without the need for hardware retooling.

SUMMARY OF THE INVENTION

The present invention is a universal drive used to control the operation of SRMs. Without limiting the universal drive of the present invention to use with machines having a particular number of phases, it will be described herein as operating with a three-phase machine. However, the invention is applicable and can be used with machines with any number of phases.

The SRM drive is coupled to sensors which measure the phase currents in the SRM and the dc-bus voltage in the converter. These currents and voltage are used to estimate the rotor reference angle position from a magnetization table. The table contains data relating magnetic flux to varying rotor angle and varying current. The table is constructed by software and placed in memory by first calculating upper and lower envelopes, the upper envelop representing the flux variation over a wide current range with the rotor pole aligned with the stator pole, and the lower envelope being flux as a function of current with the rotor pole being unaligned with the stator pole. A spacing matrix for the table is calculated by the drive using existing data or data from similar SRMs. The spacing matrix is used in subsequent steps where the intermediate flux-linkage functions (between the upper and lower envelopes) need to be determined. Thus, a magnetization table is automatically, quickly, and efficiently determined once at system commissioning.

A three-dimensional rule table which relates the torque of the machine corresponding to the turn-on and turn-off angles for different speeds is also generated automatically at system commissioning. Specifically, for a certain speed, ranges of the turn-on and turn-off angles as well as a current limit are set. Next, by iteration, a calculation is made for one turn-on angle and all turn-off angles of torque and efficiency for the selected speed. Then, the turn-on angle is stepped down and the previous step is repeated. The previous steps are repeated and the results are arranged to form a rule table of a smooth torque over a continues range. Finally, the above steps are repeated for each speed in the speed range, to form a three-dimensional rule table.

Alternatively, the system iterates within a predetermined range of turn-off angles, at each turn-off angle iterate within a range of turn-on angles. In yet another method, with a constant turn-off angle, the system iterates within a predetermined range of turn-on angles. Alternatively, with a constant turn-on angle, the system iterates within a predetermined range of turn-off angles.

The switch states of the SRM and the dc-bus voltage are input into a voltage state estimator and subsequently a flux calculator which obtains the estimated flux linkages for the respective phases. Then, the system uses these estimated flux linkages and the phase currents to look-up in the magnetization table the estimated reference angle. If the reference angle is not in the table, interpolation is used to estimate this angle. The angle is the base from which the turn-on and turn-off angles are measured.

The desired speed of the rotor is input into a PID regulator which integrates and differentiates the speed to obtain the torque. If this desired torque is not in the table, the turn-off angle is interpolated and the turn-on angle from the lower torque value of the table is used in subsequent calculations.

The turn-on, turn-off, and reference angles are converted into a series of on and off signals which are sent to a gate driver. The gate driver activates a power circuit which, in turn, drives the SRM.

In one embodiment of the present invention, the reference angle is fed back to a differentiator which creates a signal representative of an estimated speed. The estimated speed is subtracted from the desired speed (input of the user) by a summer. The output of the summer is input to the PID regulator. Error correction occurs because the output of the summer represents the difference between the desired and estimated rotor speed; when the output of the summer is zero, no further correction is necessary.

Preferably, the creation and accessing of information in the magnetization and rule tables, as well as the implementation of the PID regulator are accomplished by software which is fast and efficient in operation and easy to change and maintain.

The use of magnetization and rule tables by the present invention provides a SRM drive that is universal and adaptable for use with any type and size of switched reluctance machine. Because the drive is universal, the need to purchase both the drive and the machine as a matched pair is eliminated. Furthermore, the use of the tables automatically by the present invention avoids the requirement of expensive hardware characterization equipment or procedures and costly and unreliable rotor position sensors used in other types of switched reluctance machine systems. Finally, the invention can be implemented using microcontroller-based software that is easy to maintain.

BRIEF DESCRIPTION OF THE DRAWINGS

FIGS. 3a–3d show graphs of the data file created using the algorithm of FIG. 2a according to an embodiment of the present invention.

FIGS. 6a–6d show graphs of the data file according to yet another embodiment of the invention.

Figure 1A:
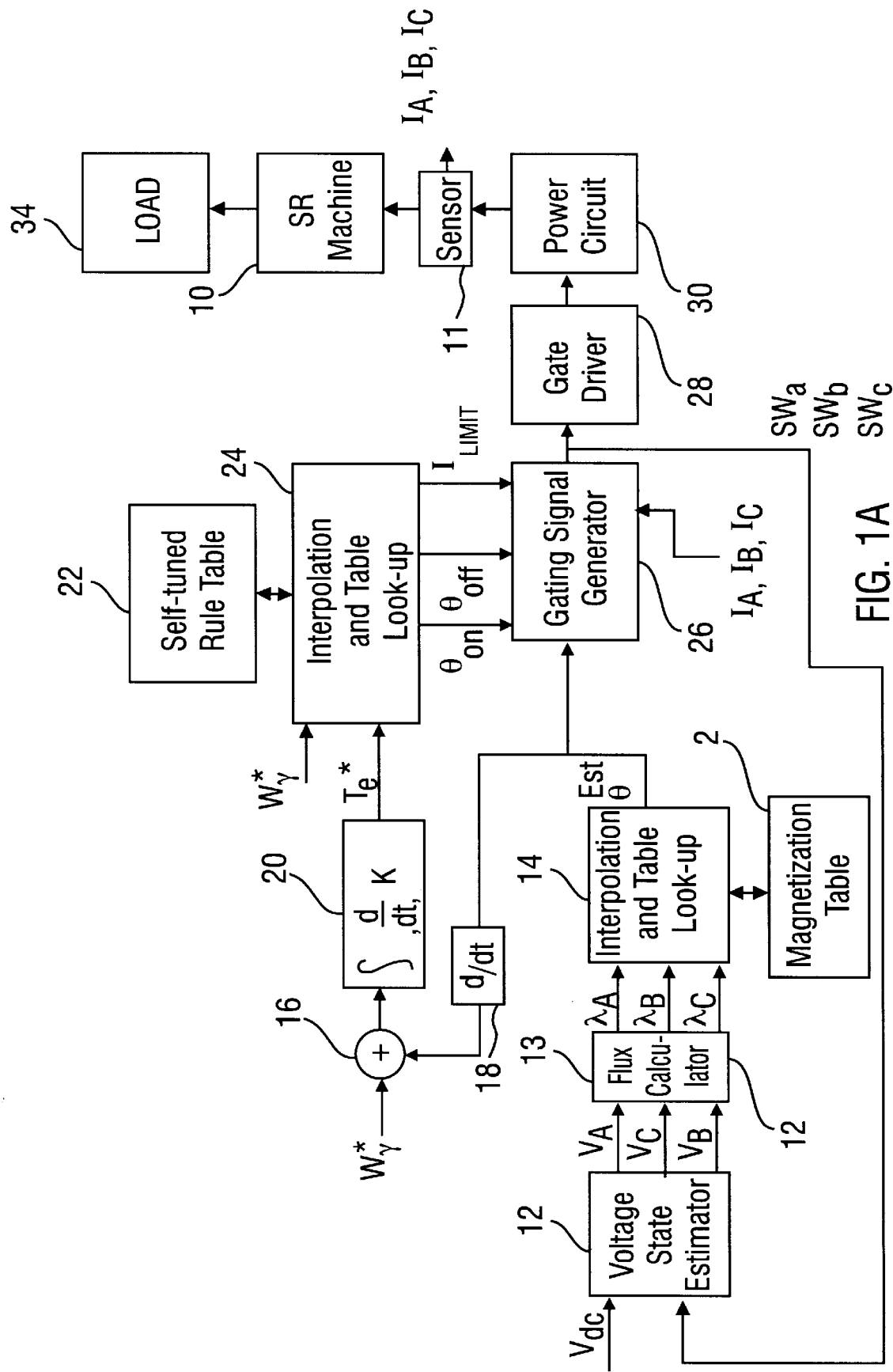
FIG. 1a is a block diagram of the SRM drive system according to the present invention.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the scope of the invention as defined by the appended claims.

DETAILED DESCRIPTION OF THE PREFERRED EMBODIMENTS

Turning now to FIG. 1a, a magnetization table 2 is automatically formed and loaded into memory within the drive and contains information relating magnetic flux to winding phase current and rotor angle. The method will be described in greater detail below. Information in the magnetization table 2 is used to form a rule table and estimate a reference angle, also as described below. The reference angle is the base reference from which all turn-on and turn-off angles are measured. The phase currents are fired in the phase windings at the turn-on angle and halted at the turn-off angle. The description below is for a three-phase SRM; however, a SRM with any number of phases can be used.

A voltage state estimator 12 receives a switching signal output from a gating signal generator 26 and a measured or set dc-bus voltage then estimates phase voltages $V_a$, $V_b$ and $V_c$. A flux calculator 13 integrates the signals representing the estimated voltages $V_a$, $V_b$ and $V_c$ and produces signals representing flux linkages $\lambda_a$, $\lambda_b$ and $\lambda_c$ which are the input into interpolation and table look-up block 14. Signals representing phase currents $I_a$, $I_b$ and $I_c$ are also input to block 14. Alternatively, $I_a$, $Ib$ and $I_c$ can be input to the flux calculator 13 and multiplied with the predetermined phase resistance value to calculate a phase winding resistance voltage drop. The phase winding resistance voltage drop is then subtracted from the bus voltage to improve accuracy in the phase voltage estimation.

The interpolation and table look-up block 14 searches the magnetization table 2 to find an estimated reference angle $\Theta_r^{EST}$. The estimated reference angle is needed to provide the turn-on angle $\Theta_{ON}$ and turn-off angle $\Theta_{OFF}$ (which determine when current is sent to a phase winding in the machine) with a base reference point in time from which to be measured. The voltage state estimator 12 and the interpolation and table look-up block 14 are described in greater detail below.

In order to provide speed tracking and error correction in the system, a differentiator 18 takes the derivative of a signal representing the estimated rotor reference angle to produce an estimated rotor speed, $\omega_{EST}$. The desired rotor speed $\omega_\gamma^*$ is input to a summer 16. The summer 16 takes the difference between the estimated rotor speed $\omega_{EST}$ and desired rotor speed $\omega_\gamma^*$ to produce a speed error signal. The speed error signal is processed by a PID type regulator 20 to produce a signal representing the desired torque, $T_e^*$. Here the PID type regulator is defined as a hardware or software, or a combinations, implemented control function that performs one or more of the following computation: proportioning, integrating, differentiating. The design of the gains of the regulator is well-known and is within the capability of one skilled in the art. When the output of summer 16 is zero, no speed error exists because the desired speed equals the estimated speed. At that point in time, no further adjustment of the rotor speed is needed. When the estimated speed is lower than the desired speed, the desired torque is increased; when the estimated speed is higher than the desired speed, the desired torque is decreased. Alternatively, if speed tracking is not desired, then differentiator 18 is omitted. In yet another embodiment of the present invention, the speed error can be obtained by comparing the desired rotor speed to the true rotor speed as measured by a rotor position sensor, instead of the estimated speed. However, this option requires the use of a rotor position sensor.

A self-tuned rule table 22 is automatically loaded into memory within the drive at system commissioning and contains information relating torque to turn-on and turn-off angles. The algorithm used to form the table is described below. During normal operation of the drive, an interpolation and table look-up block 24 uses $T_e^*$ (produced by the regulator 20) and $\omega_\gamma^*$ as index and accesses the corresponding turn-on and turn-off angles from the self-tuned rule table 22. The turn-on, turn-off, and reference angles are then input into the gating signal generator 26. With this angular information, the signal generator produces turn-on and turn-off signals for the gate drivers 28. Interpolation and table look-up block 24 also provide the current limit, also from the rule table 22 along with the turn-on and turn-off angles.

Figure 1B:
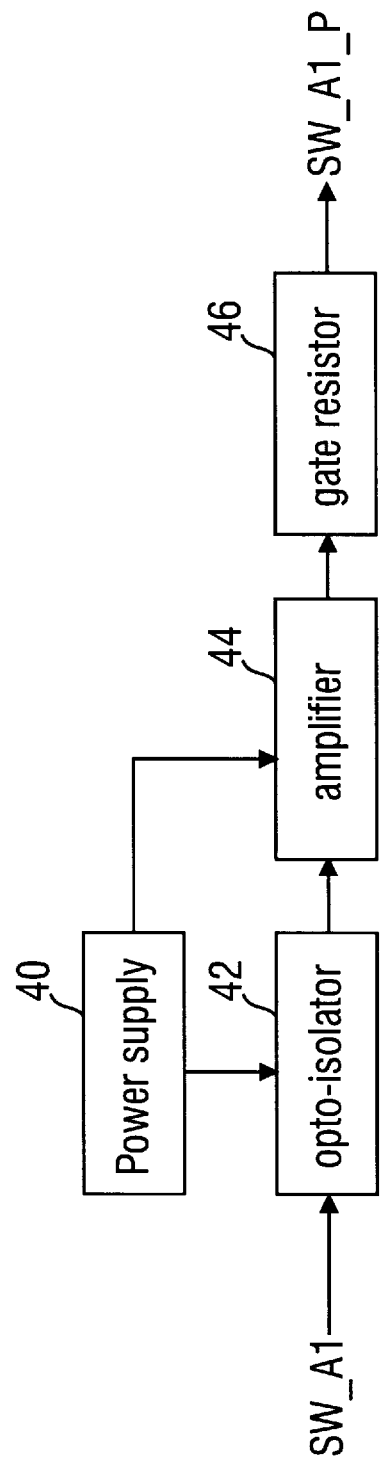
FIG. 1b is a circuit block diagram of the gate driver according to the present invention.
Figure 1C:
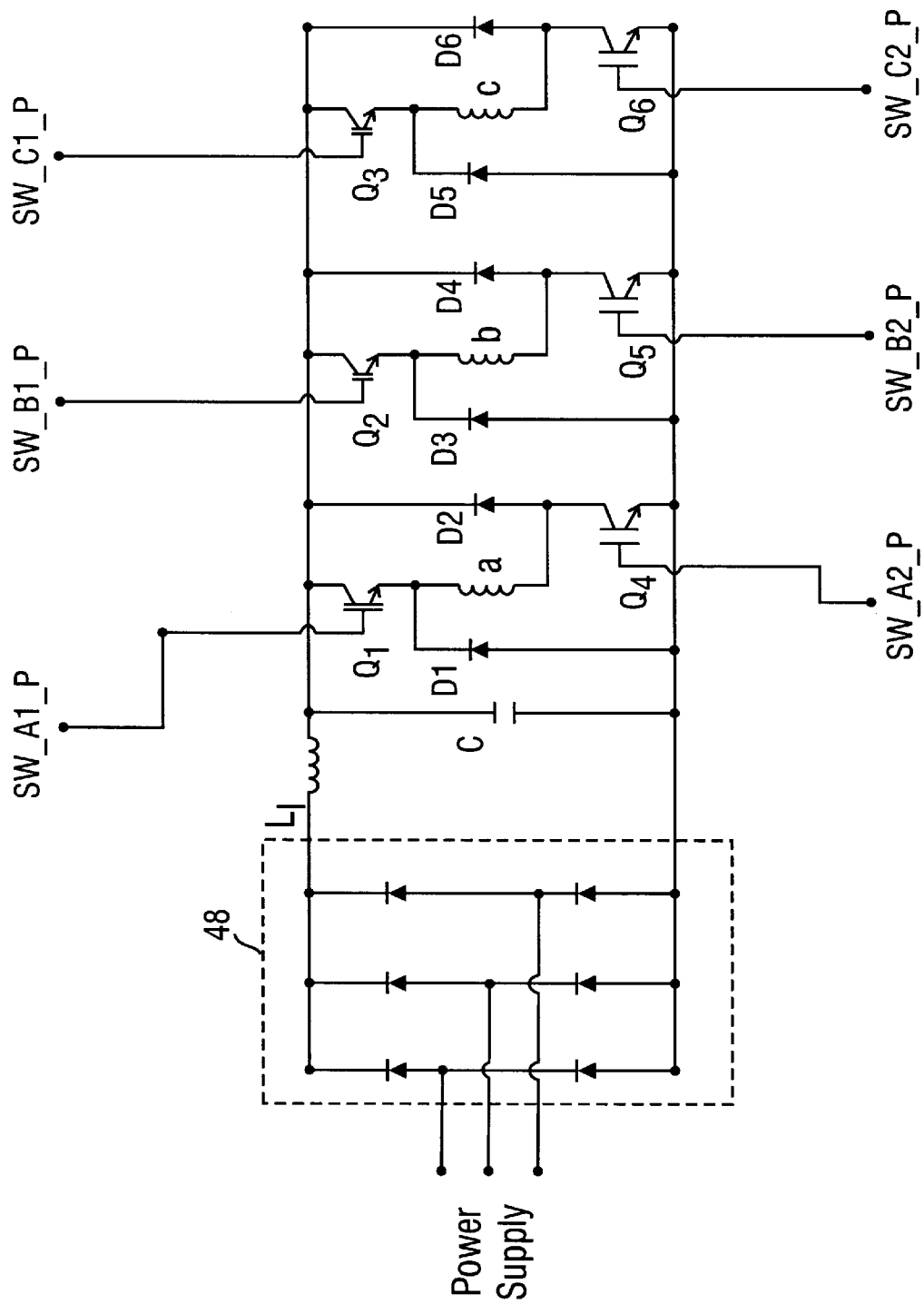
FIG. 1c is a circuit diagram of the power circuit according to the present invention.
Figure 1D:
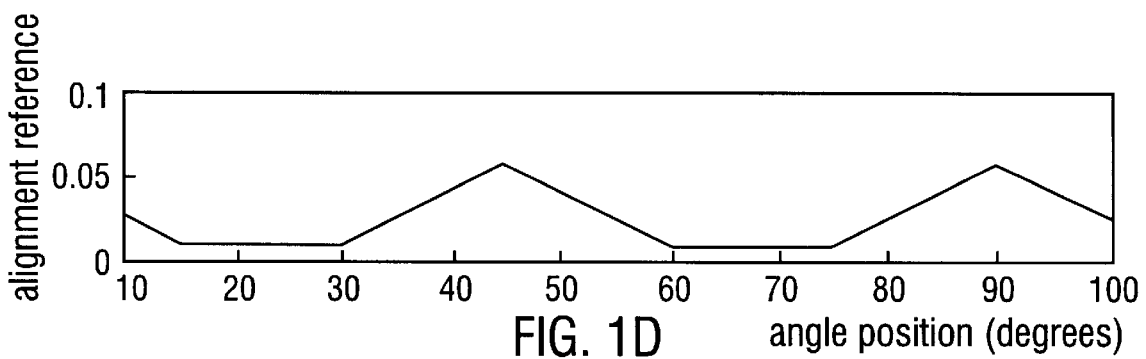
FIGS. 1d–1g are graphs of rotor alignment, current, flux, and torque according to the present invention in low speed range (i.e., chopping mode).
Figure 1E:
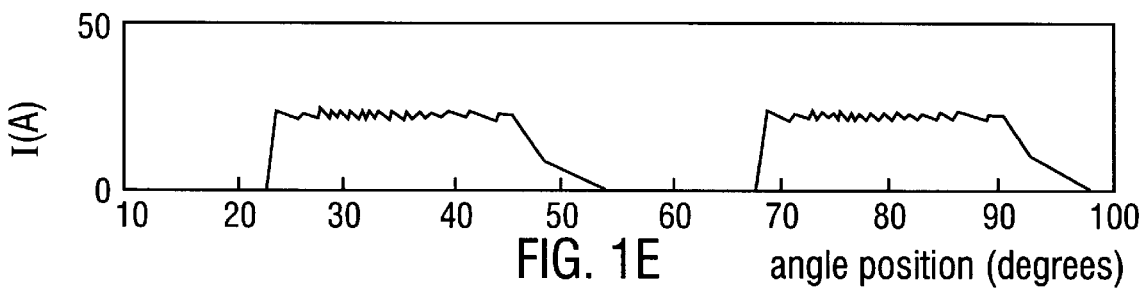
Figure 1F:
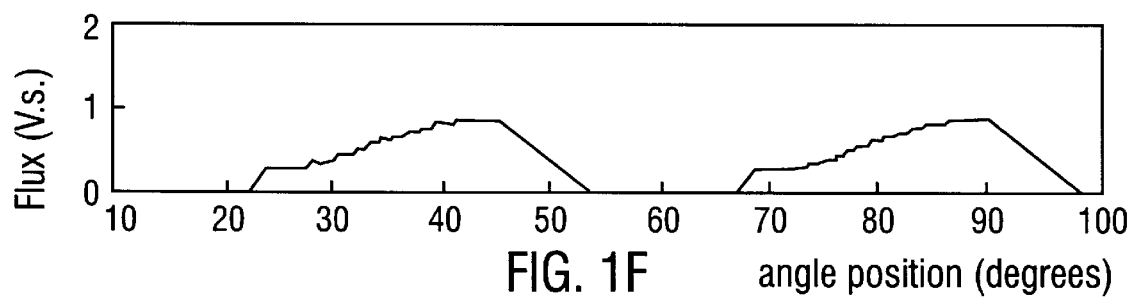
Figure 1G:
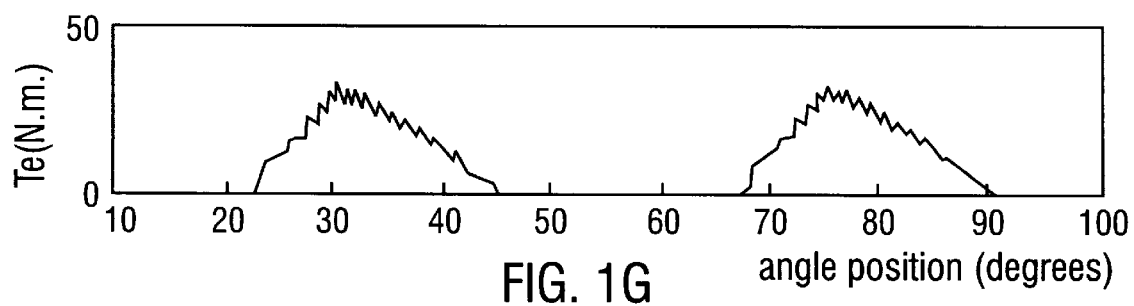
Figure 1H:
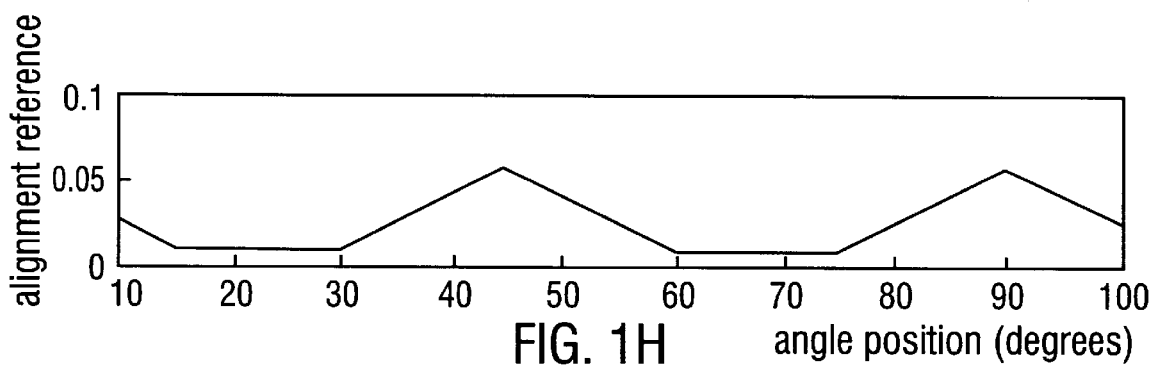
FIGS. 1h–1k are graphs of rotor alignment, current, flux, and torque in high speed range (i.e., single pulse mode).
Figure 1I:
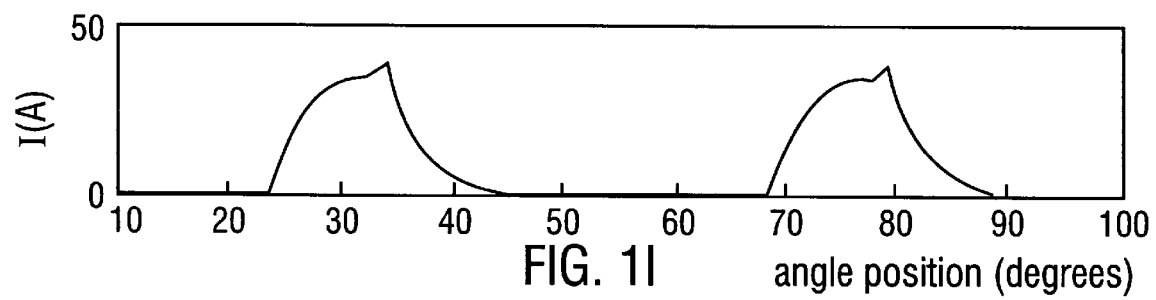
Figure 1J:
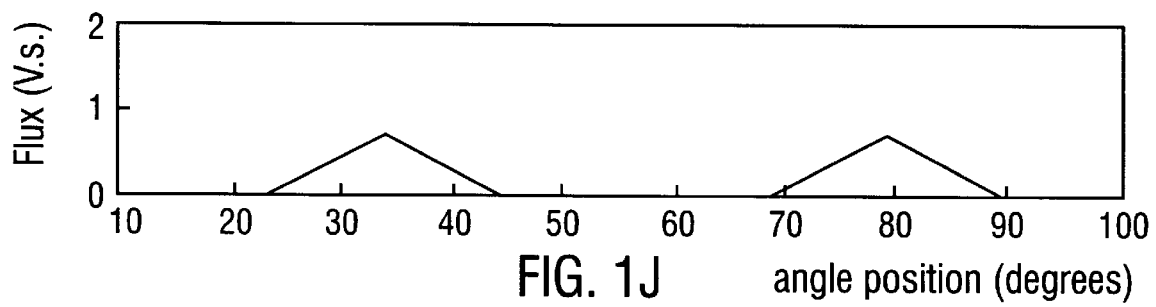
Figure 1K:
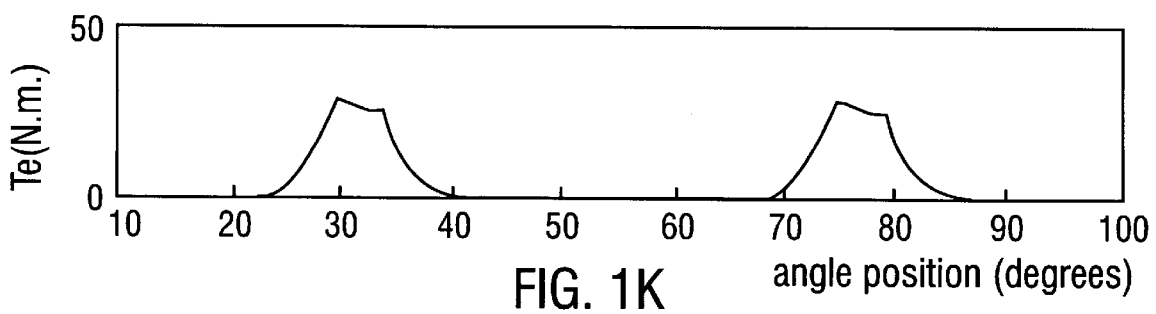

The relationship between reference angle and turn-on and turn-off angles is illustrated in FIGS. 1d–1g which illustrate the low speed operation of the drive for one phase of the SRM. FIG. 1d illustrates that at a 30 degree reference angle, the rotor poles and the stator poles of the phase start to overlap. Then, at 45 degrees, the rotor poles are exactly in alignment with the stator poles for the phase. At 22.5 degrees the maximum nonalignment position of the rotor poles with respect to the stator poles occurs. As shown in FIG. 1e, the turn-on angle is 22.5 degrees, the turn-off angle is 45 degrees, and the current limit is 23 amperes for the phase shown. The corresponding flux linkage and torque contribution from that phase are illustrated in FIGS. 1f and 1g.

Similarly, FIGS. 1h–1k illustrate the high speed operation of the device for one phase of the SRM. The phase turn-on angle is 23.7° and the phase turn-off angle is 34.2°. The corresponding flux linkage and torque contribution from that phase are also shown.

Figure 1L:
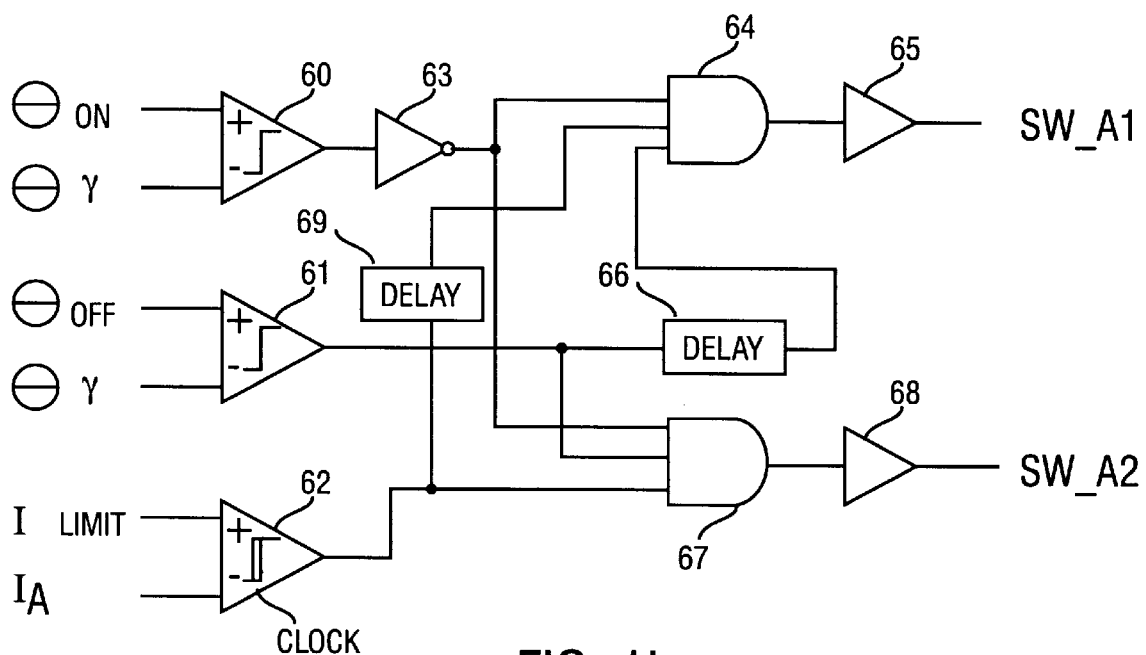
FIG. 1l is a circuit diagram block of the gating signal generator according to the present invention.

As shown in FIG. 1l, a gating signal generator 26 for one phase (phase A) of the SRM comprises a first comparator 60 which compares the turn-on angle to the reference angle while a second comparator 61 compares the turn-off angle to the reference angle. A hysterisis comparator 62 compares at a clock frequency the current limit to the current measured in the phase winding, $I_a$. A logic inverter 63 inverts the logic of the comparator 60 output. When the reference angle is greater than the turn-on angle but less than the turn-off angle and the measured current in the winding is less than the current limit, logic AND gates 64 and 67 are at "high" state. Buffers 65 and 68 then cause signals SW_A1 and S_A2 to go high. When the reference angle becomes greater than the turn-off angle or when the measured current in the winding is greater than the current limit, gates 64 and 67 are at "low", and signals SW_A1 and SW_A2 are at "low" state. A delay 66 is provided for free-wheeling purposes (applied winding voltage is zero) after current turn-off occurs. That is, the upper signal SW_A1 is turned off after a delay while the lower signal SW_A2 is deactivated immediately. A delay 69 is provided for free-wheeling purposes after the phase current goes higher than the current limit. The free-wheeling characteristic helps reduce noise and vibration allowing for soft switching of the current and voltage which may also increase efficiency of the drive.

The comparator 62 is a hysterisis comparator instead of a normal comparator because the use of hysterisis adds a tolerance band to $I_{limit}$ avoiding chattering. If an ordinary comparator were used, as the phase current becomes greater than $I_{limit}$, the gates 64 and 67 would go low. Then, at the next clock triggered comparison, since the phase current will be smaller than $I_{limit}$, the gates 64 and 67 will be turned high to drive the current up again. At the next clock cycle, $I_a$ will likely be greater than $I_{limit}$ and the gates 64 and 67 will be low again. Therefore, with an ordinary comparator, the gates 64 and 67 will keep switching states and be synchronized to the clock. The phase current $I_a$ will chatter around $I_{limit}$ until the rotor angle reaches the turn-off angle of that phase. Such a high frequency switching would produce large switching losses and switching stresses in the drive and motor.

Instead, comparator 62 is a hysterisis comparator which eliminates the chattering and reduces the switching frequency. Three types of hysterisis band can be used: upper band (the band adds on to $I_{limit}$ to yield the highest boundary), lower hysterisis (the band subtracts from $I_{limit}$ to yield the lowest boundary) and middle hysterisis (part of the band adds to $I_{limit}$ to get the highest boundary and the other part subtracts from $I_{limit}$ to obtain the lowest boundary). Preferably, comparator 62 utilizes the lower hysterisis band. In this case, when the phase current becomes greater than $I_{limit}$, gates 64 and 67 become low. At the next clock cycles, the gates 64 and 67 will not switch state until the phase current becomes smaller than $I_{limit}$ minus the hysterisis band. The gates 64 and 67 will be and remain low after the rotor angle reaches the turn-off angle for that phase and before the next turn-on point.

FIG. 1l shows the logic circuitry for one phase of the machine. The other phases are identical except that the turn-on and turn-off angles are shifted by 120 degrees. The logic of the gating signal generator shown in FIG. 1l can be implemented in hardware, or can be implemented using software using actual programming techniques that are well-known in the art.

The block diagram of the gate driver 28 is illustrated in FIG. 1b. A power supply 40 is connected to an opto-isolator 42 and an amplifier 44. The opto-isolator provides signal isolation and buffering between the gate signal and the amplifier 44. A gate resistor 46 is connected between the amplifier 44 and the switch gate for the control of the switching speed. FIG. 1b shows one gate driver only. For a three-phase machine, there will be six gate drivers, one for each power switch.

Referring again to FIG. 1a, the outputs of the gate drivers 28 are fed to the power circuit 30 which adjusts the currents and voltages for the SR machine 10. As shown, the SR machine then is used to drive a load 34.

The power circuit 30 is illustrated in detail in FIG. 1c. A diode rectification circuit 48 comprising six diodes rectifies the ac line voltage into a dc voltage. A filtering inductor, L1, and a capacitor C provide a DC link between the diode rectification circuit 48 and the remainder of the circuit; i.e., the inverter circuit. The gate drivers are connected to the gates of IGBT power switching devices Q1, Q2, Q3, Q4, Q5, and Q6. The power switching devices are activated and de-activated by the gating signals to supply the desired current waveforms to the phase windings a, b, and c. Free-wheeling diodes D1, D2, D3, D4, D5, and D6 are also provided. Even though the IGBT devices are shown as an example, other power switching devices such as MOSFET and BJT can also be used. Still further, even though the asymmetrical two switch per phase inverter structure is shown, other drive circuits known to be appropriate for SR machines can also be used with the control method according to the present invention.

The creation of the self-tuned rule table 22 and magnetization table 2, as well as the functionality of regulator 20, differentiator 18, summer 16, gating signal generator 26, and both interpolation and table look-up blocks 14 and 24 are preferably mostly accomplished using software run on microprocessors, microcontrollers or digital signal processors (DSPs) which utilize appropriate on chip or on board memory elements. Modifications and improvements to the system, therefore, can be easily accomplished. The software is also portable between different drives. Many microprocessors or DSPs can be used, for example, the Motorola DSP56002 or Texas Instrument TMS320C40. The memory elements are chosen so as to have adequate size to be able to store the tables used in the drive and the intermediate data files generated during self-tuning and operation, as well as the software program.

Figure 2A:
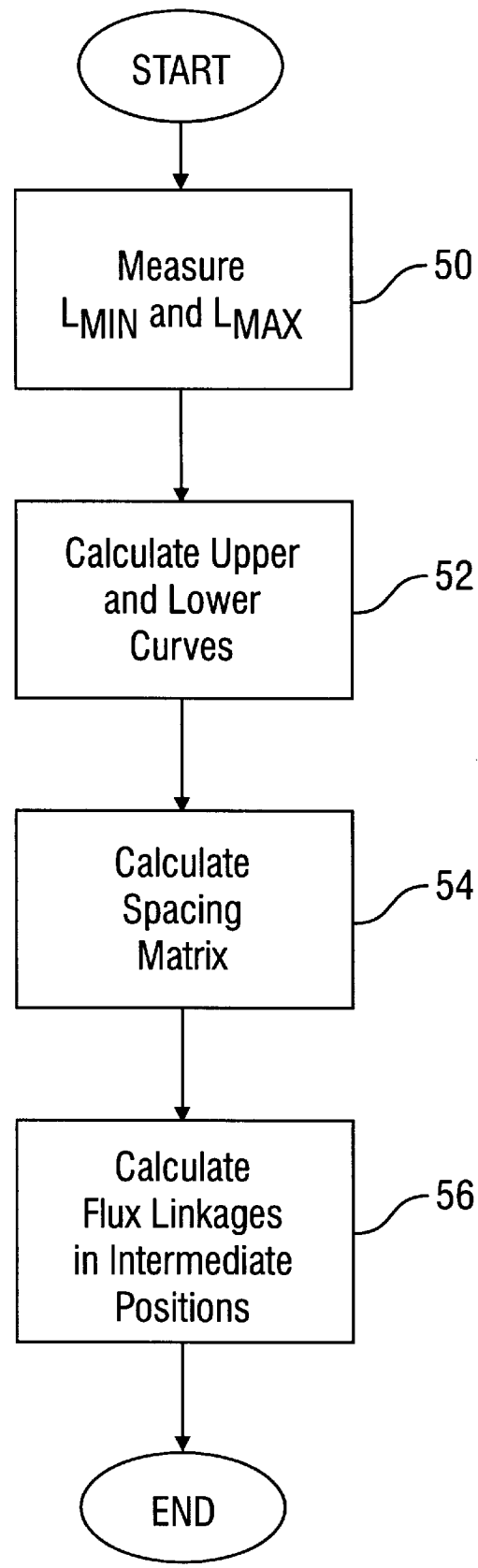
FIG. 2a shows the algorithm for creating the magnetization table according to the present invention.
Figure 2B:
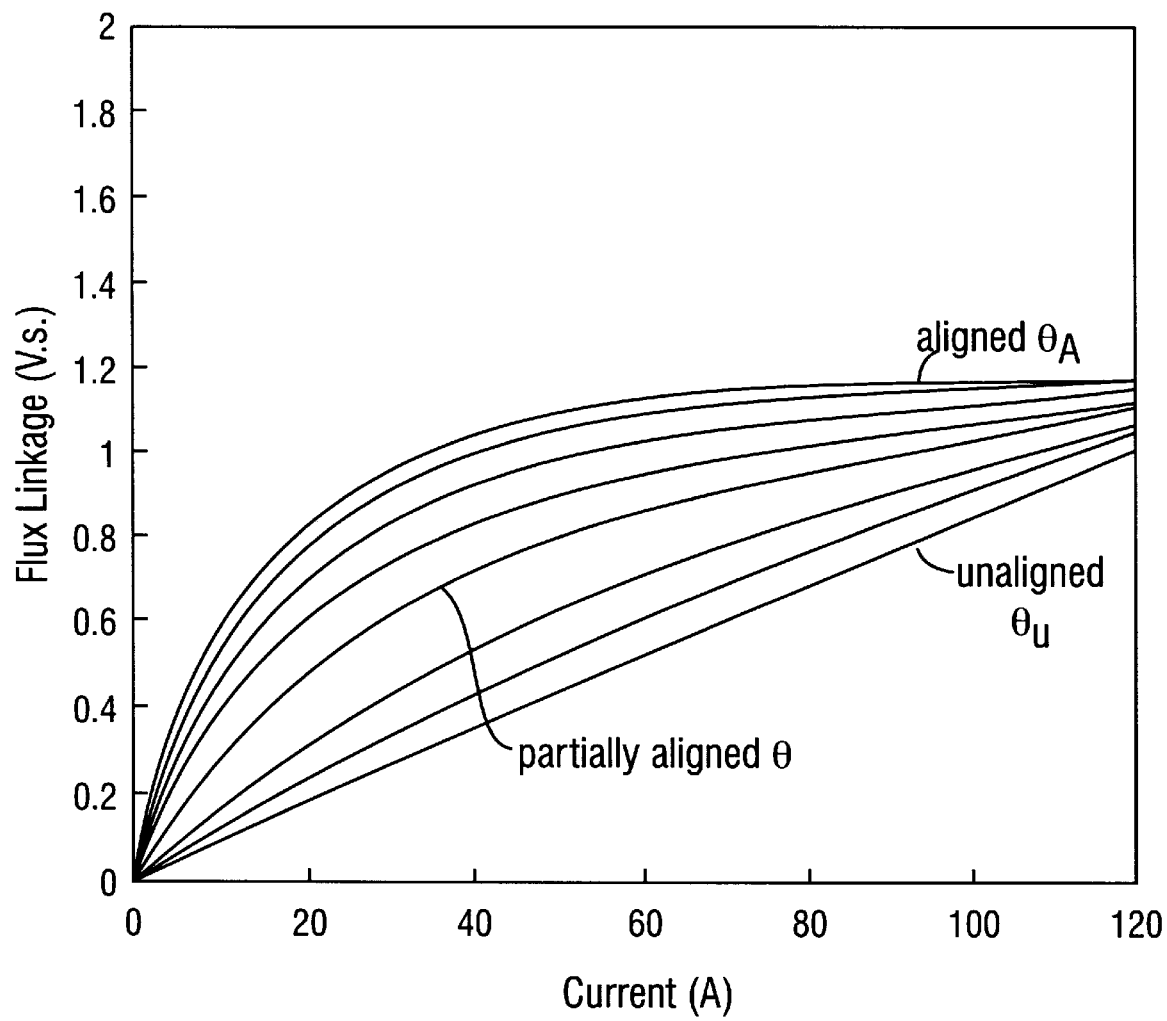
FIG. 2b shows a magnetization table created with the algorithm of FIG. 2a according to the present invention.

Referring now to FIG. 2a, the magnetization table 2 is created using a mapped spacing matrix method which calculates the flux linkages present in the machine. A graphical representation of the table created by the algorithm of FIG. 2a is shown in FIG. 2b where the curves represent the flux linkages change over winding current for particular angles of the rotor. The intermediate curves are interpolated based upon the principle that among a wide variety and sizes of SRMs, the shapes of the intermediate magnetization curves relative to the aligned and unaligned curves are similar. Near the aligned and unaligned positions, the curves are crowded together, and become more evenly spaced in between curves representing the aligned and unaligned positions. The relative spacing among the curves bounded by the top and bottom curves is generalized by a spacing matrix whose elements are defined as:

$$c(\Theta, I) = \frac{\lambda'(\Theta, I) - \lambda'(\Theta_u, I)}{\lambda'(\Theta_A, I) - \lambda'(\Theta_u, I)}$$

and the flux linkages in the intermediate positions are given by:

$$\lambda(\Theta,I) = c(\Theta,I)(\lambda(\Theta_A,I) - \lambda(\Theta_u,I)) + \lambda(\Theta_u,I)$$

where $c(\Theta,I)$ can be generalized for a variety of SRMs from curve-fitting data. Also, all primed elements are taken from existing data from measurements or similar SRMs. For each intermediate position, the error of the flux-linkage prediction is limited due to the finite number of other positions, and, in general, depends more on the accuracy of the top and bottom curves.

Referring again to FIG. 2a, at step 50, the minimum and maximum inductances of the windings are measured, as is known in the art, when the rotor is at a standstill. The minimum and maximum inductances of the windings are represented in FIG. 2b by the slopes of the unaligned (bottom) curve and aligned (top) curve. Adequate number of points need to be obtained for the normally saturated aligned inductances (i.e., maximum inductances) to represent the top curve. Next, at step 52, upper and lower curves representing the rotor in the aligned and unaligned positions, respectively, are calculated and stored using the slopes calculated in step 50. Next, at step 54, a spacing matrix is calculated, as described above. Finally, the spacing matrix is used in calculations which determine the intermediate curves.

The self-tuned rule table 22 can be generated using one of several methods. For example, referring now to FIGS. 3a–3d, a range of the turn-on and turn-off angles are selected. For a constant turn-on angle, the turn-off angle is varied and the torque, peak current and machine efficiency calculated. For instance, at the far right side of FIG. 3a, the turn-on angle is set at a constant 20 degrees. As shown, the turn-off angle is set initially at 25 degrees, then incremented, step-by-step, to 35 degrees. The corresponding peak current, torque and efficiency are shown in FIGS. 3b–3d, respectively. The turn-on angle is then stepped down and the above process repeated. A current limit of 75A is imposed as mainly limited by the switch device rating.

Figure 2C:
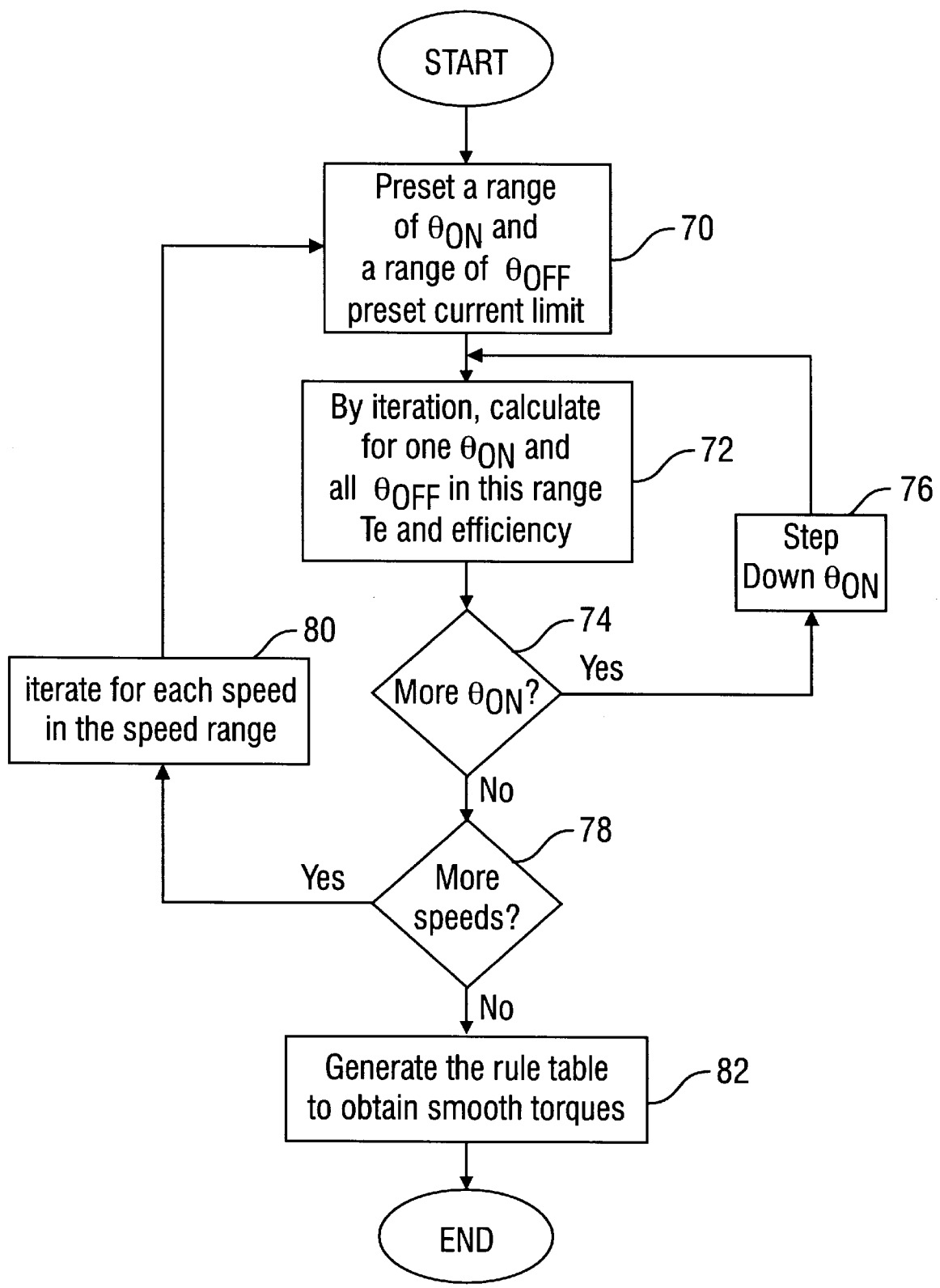
FIG. 2c shows an algorithm for creating the self-tuned look-up table according to the present invention.

The algorithm of generating the data of FIGS. 3a–3d is given in FIG. 2c. At step 70, the range of the turn-on and turn-off angles are set from the basic machine information such as machine pole numbers and phase number. Also, the current limit is set according to the switch rating, for example, 75 amps. At step 72, by iteration, the drive calculates for one turn-on angle and all turn-off angles within the range, the torque, peak current and efficiencies. The calculation is performed through time-stepping computer simulation of the operation of the SRM and drive circuit whose dynamic equations and solution techniques are well-known in the art. The main dynamic equations are listed in the following:

$$v_a = R_a i_a + \omega_\gamma \frac{d\lambda_a}{d\theta_\gamma}$$

$$v_b = R_b i_b + \omega_\gamma \frac{d\lambda_b}{d\theta_\gamma}$$

$$v_c = R_c i_c + \omega_\gamma \frac{d\lambda_c}{d\theta_\gamma}$$

$$W_a = \oint \lambda_a d i_a$$

$$W_b = \oint \lambda_b d i_b$$

$$W_c = \oint \lambda_c d i_c$$

$$T_e = \frac{N_\gamma}{2\pi}(W_a + W_b + W_c)$$

$$v_a = sw_a v_{dc}$$

$$v_b = sw_b v_{dc}$$

$$v_c = sw_c v_{dc}$$

Where $V_{dc}$ is the dc-bus voltage; $V_{a,\ b,\ c}$ are the phase voltages; $i_a$, $i_b$, $i_c$ are the phase currents; $Sw_{a,\ b,\ c}$ are the phase switching states representing the excitation states of phase windings which assume state "1" when the phase is "on", "0" when the phase is free-wheeling, and "−1" when the phase is "off", as further explained later; $W_{a,\ b,\ c}$ are the phase energy during each stroke of pole overlapping; $R_{a,\ b,\ c}$ are the phase winding resistances; $\lambda_{a,\ b,\ c}$ are the phase flux-linkages; $T_e$ is the electromagnetic torque; $\omega\gamma$ is the rotor speed and $\theta\gamma$ is the rotor reference position: $N\gamma$ is the rotor pole number. With $sw_{a,\ b,\ c}$ known from the knowledge of switching states, and with $V_{dc}$, $\omega_\gamma$, $N\gamma$, $R_{a,\ b,\ c}$ known, $T_e$ and peak values of $i_a$, $i_b$, and $i_c$, can be solved for using known techniques in numerical analysis. The efficiency can be calculated also using known techniques in the art.

Turning back to FIG. 2c, at step 74, the system determines whether there are more turn-on angles in the range. If the answer is affirmative, at step 76 the turn-on angle is decremented and the system continues at step 72. If the answer to step 74 is negative, the system proceeds to step 78 where it determines whether more speeds within the speed range need to be calculated. If the answer to step 78 is affirmative, then at step 80, a new speed in the speed range is found, and the system continues at step 70 with iterations using that new speed. If the answer to step 78 is negative, then at step 82 the system generates a rule table where the torque is "smooth"; in other words the rule table would have data corresponding to the graphs of FIGS. 4a–4e.

Figure 4A:
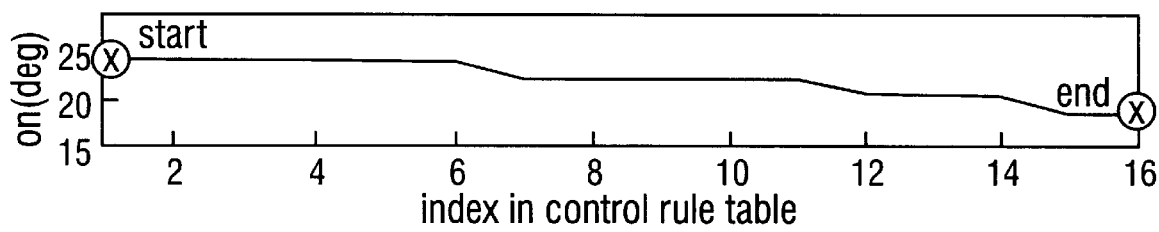
FIGS. 4a–4e show searching and rearranging the results illustrated in FIGS. 3a–3d to create a self-tuned look-up table according to the present invention.
Figure 4B:
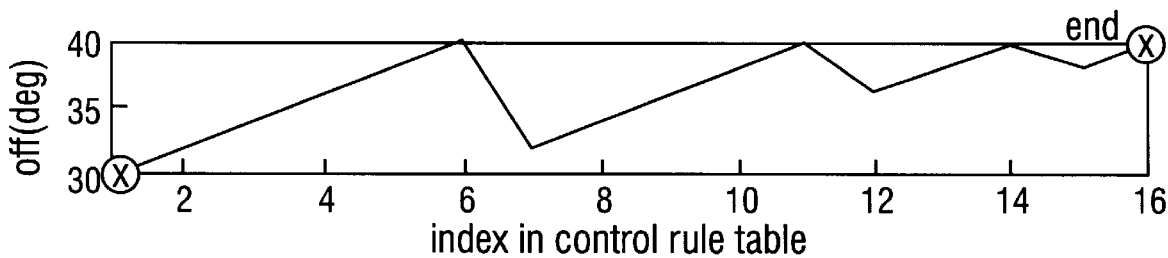
Figure 4C:
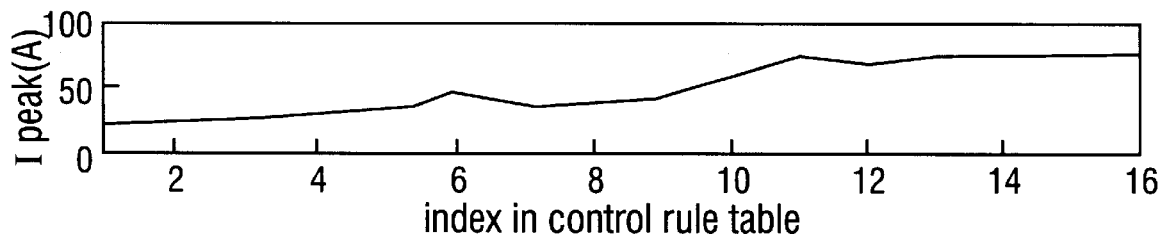
Figure 4D:
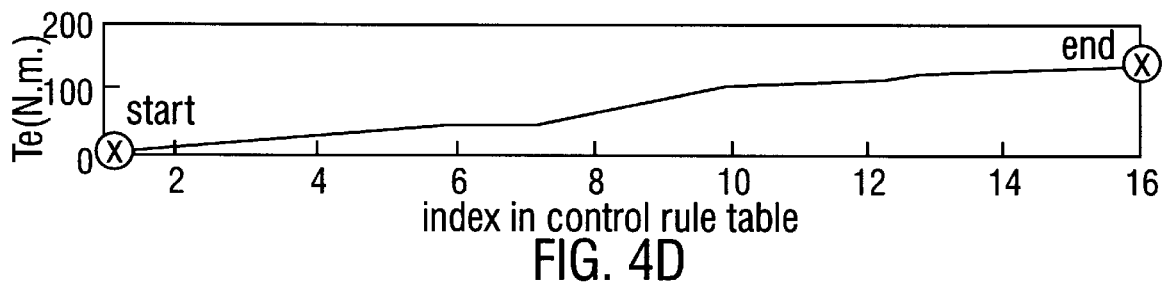
Figure 4E:
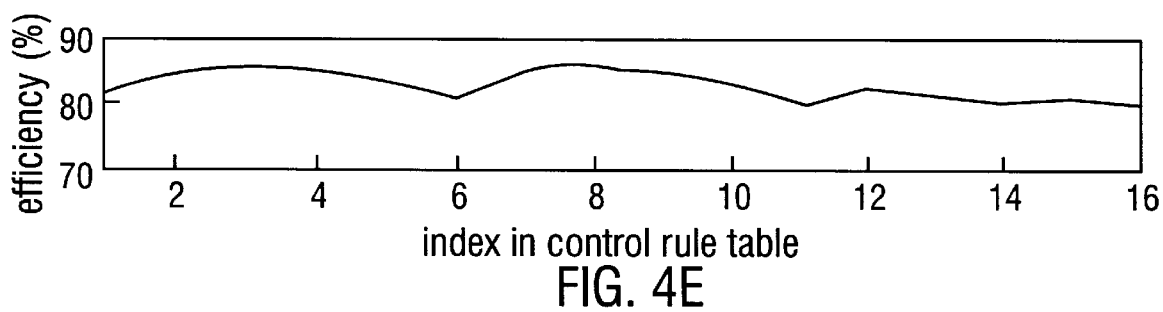
Figure 5:
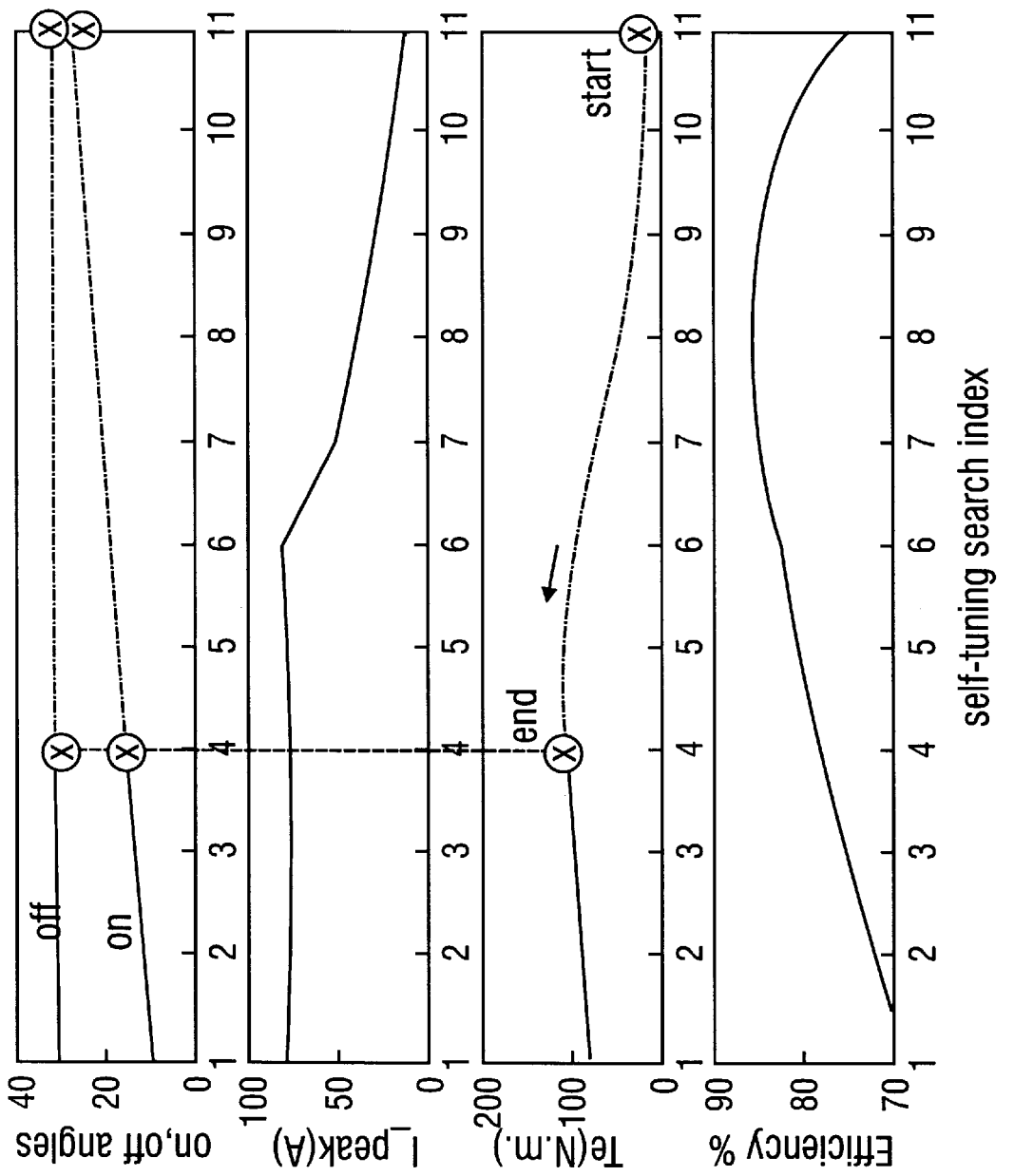
FIGS. 5a–5d show graphs of the data file according to another embodiment of the invention.
FIGS. 5e–5i show an alternate self-tuned look-up table according to another embodiment of the present invention, by searching and rearranging the results illustrated in FIGS. 5a–5d.
Figure 5E:
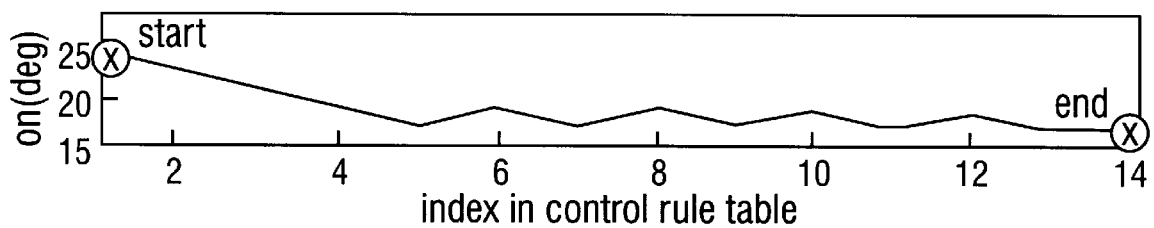
Figure 5F:
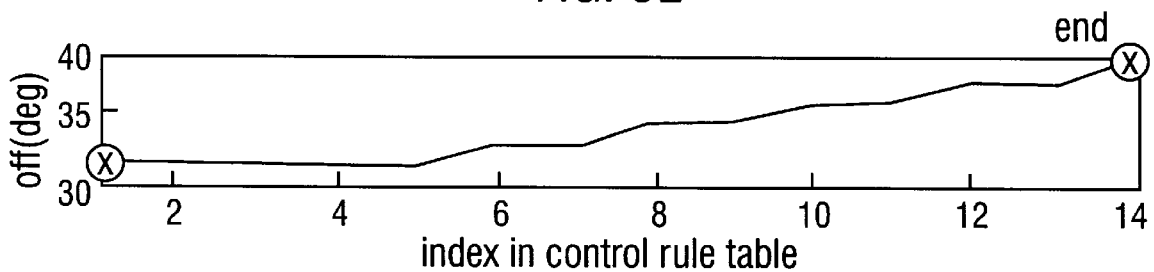
Figure 5G:
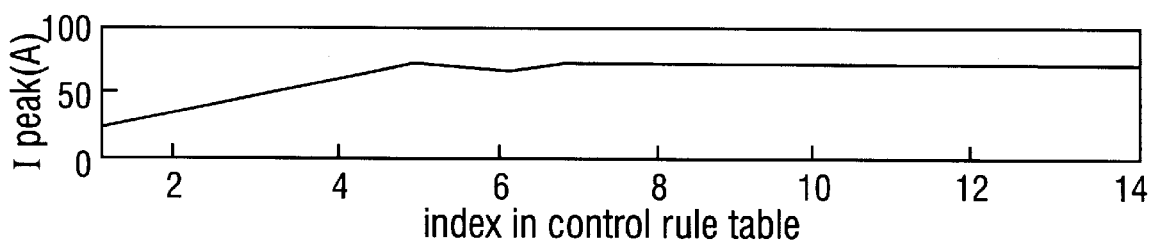
Figure 5H:
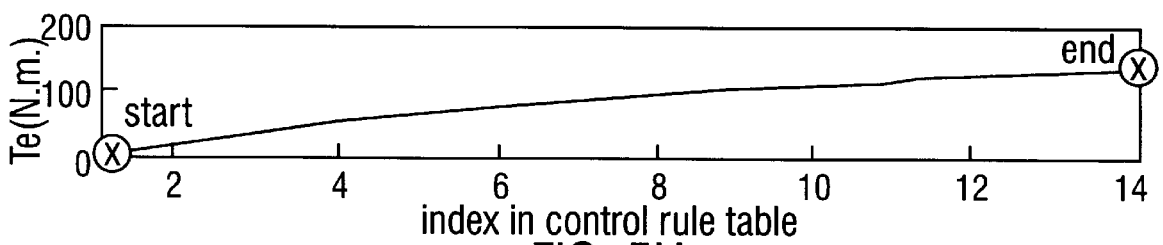
Figure 5I:
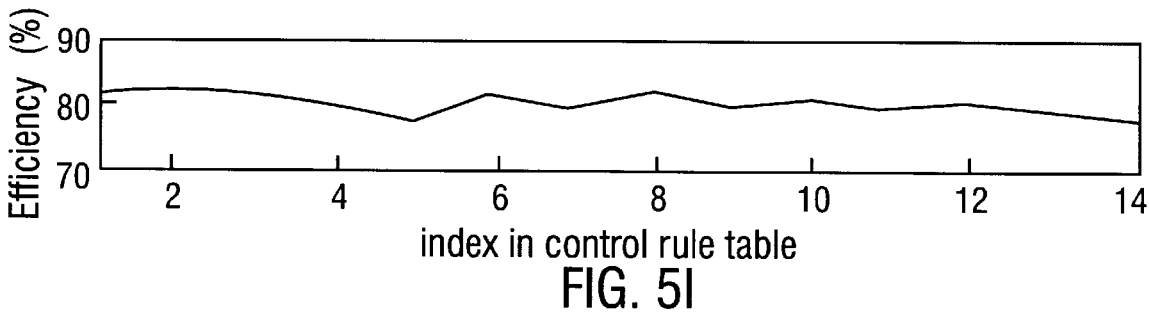
Figure 6E:
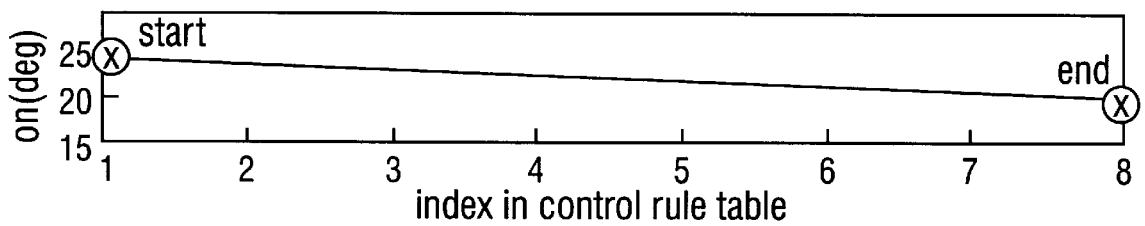
FIGS. 6e–6i show an alternate self-tuned rule table according to the present invention.
Figure 6F:
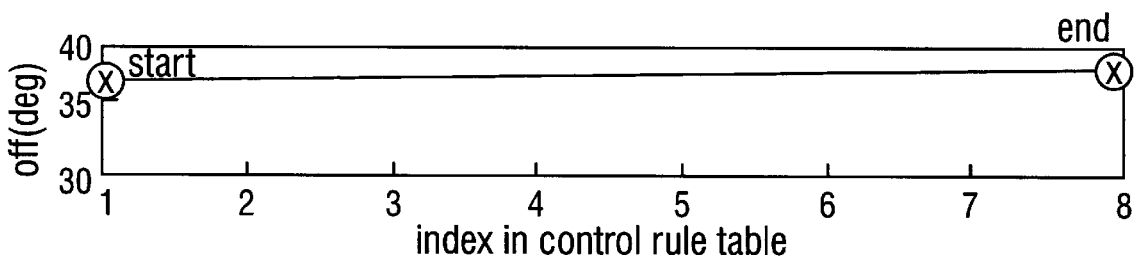
Figure 6G:
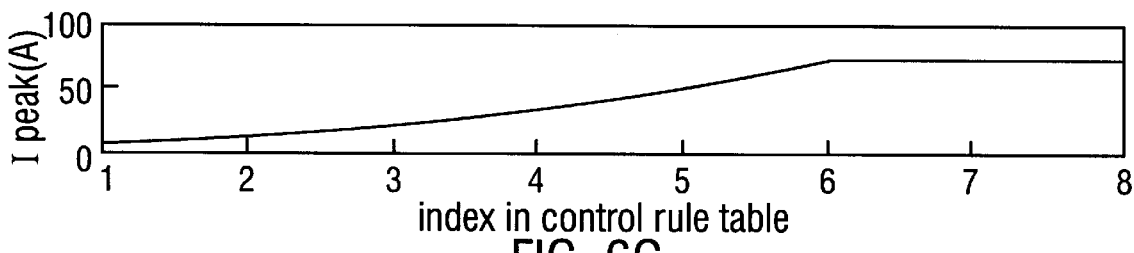
Figure 6H:
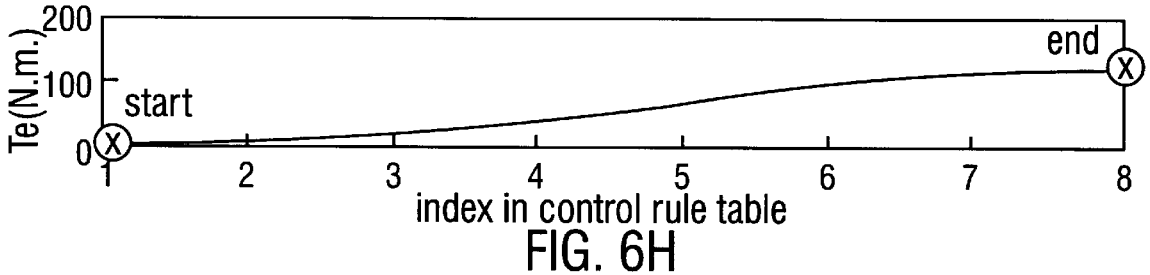
Figure 6I:
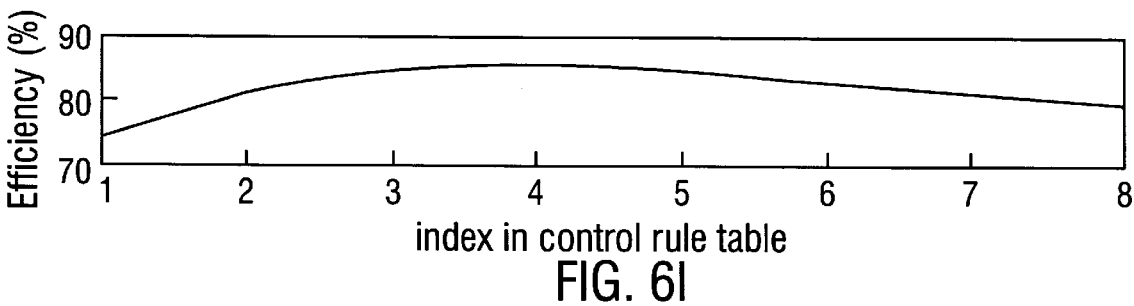
Figure 7A:
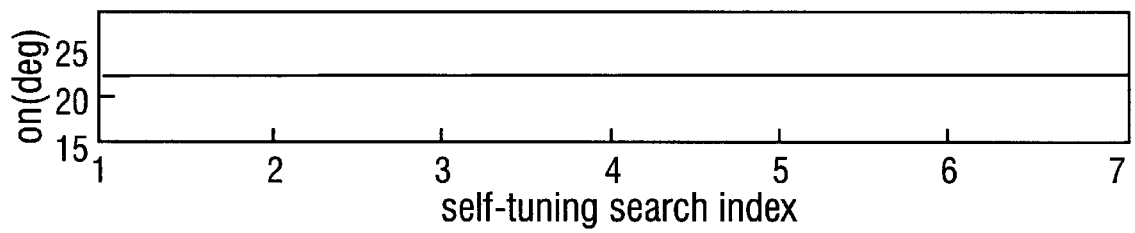
FIGS. 7a–7e show an alternate look-up table according to another embodiment of the present invention.
Figure 7B:
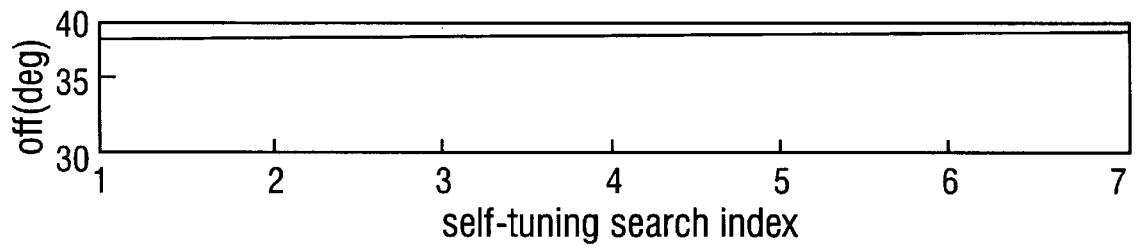
Figure 7C:
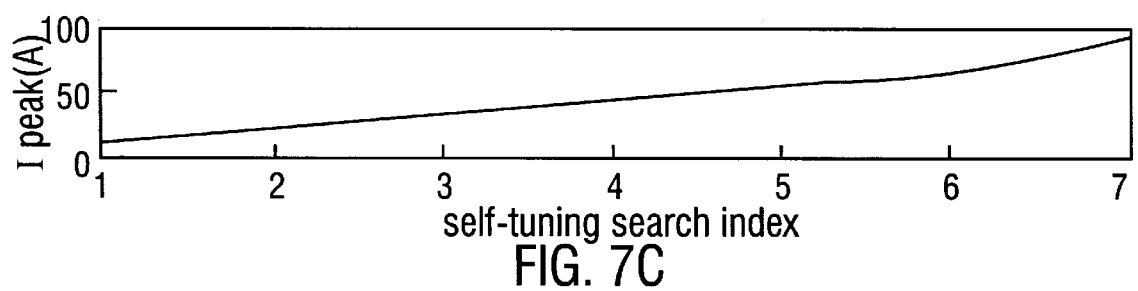
Figure 7D:
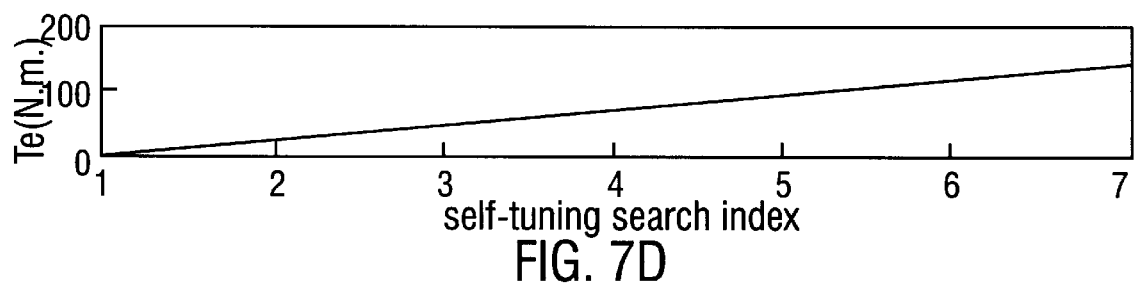
Figure 7E:
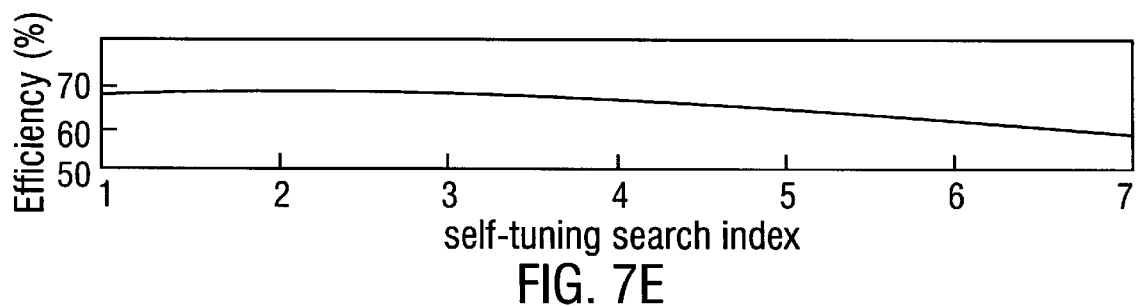

As shown in FIGS. 3a–3c, the relationship between torque and the control variables (e.g. turn-on and turn-off angles) is non-linear and non-unique. A piecewise linear torque function can be obtained with a unique combination of control angles, as shown in FIG. 4a, 4b and 4d. This is done by tracing through the non-linear, non-unique torque function, shown in FIG. 3c, from the lowest value up to the highest value. As a result, as shown in FIG. 4a, to obtain a smooth torque function from near zero up to the highest possible value, the turn-on angle has a stepped decent (angle advancing) and as shown in FIG. 4b, the turn-off angle has an alternating gradient sign (angle advancing or prolonging) but the overall trend is angle prolonging to retain more current to produce higher torque. The peak current is limited by the switch current rating at higher torque points. The above can ideally be accomplished using software, based on the tracing and torque smoothing methods according to the present invention with known programming practice in the art.

Alternatively, the system could iterate torque within a predetermined range of turn-off angles, and, at each turn-off angle iterate within a range of turn-on angles. The resulting data file containing the iteration results is graphed in FIGS. 5a–5d. After tracing from the lowest torque to the highest torque, the resulting smooth graphs that step through unique torque values are shown in FIGS. 5e–5i. In yet another method, with a constant turn-off angle, the system could iterate within a predetermined range of turn-on angles. The resulting data file is graphed in FIGS. 6a–6d. The resulting smooth graphs are illustrated in 6e–6i. Alternatively, with a constant turn-on angle, the system could iterate within a predetermined range of turn-off angles. Finally, especially suitable for low speed operation, both the turn-on angle and the turn-off angle can be fixed at the preset values while the current limit is now iterating from zero up to the rated limit. In such cases the tracing procedure is not necessary as a smooth torque has been obtained from the iteration. The resulting graphs are shown in FIGS. 7a–7e.

In all methods, for a specific speed of operation, a piecewise-linearized torque function is obtained, and the resulting combination of turn-on and turn-off angles can be stored in a two-dimensional rule table with the torque as the index. In the real-time operation at the same speed, the control combination is look-up from the table. It is often necessary to interpolate when the torque demand is between any two calculated set points. If the desired torque is not in the table, interpolation is used to find the turn-off angle while the same turn-on angle of the immediately lower torque in the table is used.

The interpolation indicates the use of the principle of piecewise linearization of the torque/control relationship. Using this approach, the rule table is quite smooth. Therefore, the table look-up and the interpolation for any torque demand in the torque range for that speed. It should be noted that the piecewise linear torque function is often saturated at the top end. Considering all the speeds throughout the speed range, the self-tuned rule table is three-dimensional with the speed and torque as the two indexes. Therefore, in real time, three dimensional interpolation is used.

The algorithms described above can be run on a separate computing device containing a microprocessor to obtain the three-dimensional rule table that is downloaded into the memory residing on the controller board of the drives. Alternatively, it is preferred to perform the self-tuning within the drive, with the properly compiled and executable software program and a sufficient run-time engine or kernel operating system residing in the memory on the controller board. Since the rule and magnetization tables are automatically created, a drive equipped with such a program can be matched with any similarly rated SRM. As described above, the information needed from the machine includes the number of phases, number of stator poles, number of rotor poles, the unaligned inductance, the aligned inductance at several current values when the phase current is dc, and the winding resistance. These inductances and resistances can be measured easily using a variety of known techniques. The machine is assumed to be balanced among the phases. In addition, the switch current limit and the bus voltage should be known. The DC bus voltage is assumed to be constant which is true in most cases with a conventional two switch-per-phase SRM power converter.

The self-tuning of the rule table and the interpolation and table look-up processes form a feed forward control function based on precalculated control mappings using a minimum number of predetermined system parameters and preset ranges of control angles. The adequacy and feasibility of this type of feed forward control are well justified. With the limited numbers of stator and rotor poles normally the SRM has sufficiently long stroke period for each phase (i.e., useful torque production zone), if compared to the sensitivity of the phase turn-on and off angles on the torque. In addition the current level can be adjusted by current regulation. Therefore, there is sufficient controllability and programmability of the torque. For a regular and well-designed SRM, the torque produced during each phase excitation generally depends on the phase current and flux-linkage waveforms which, in turn, are consistent and allowing for some errors, can be predicted. Even though the torque demand could not be followed accurately by such a feed forward control, the speed demand can be tracked (by the estimated speed) due to the compensation brought by the speed loop feedback regulation to actually obtain the right amount of torque.

Now returning to FIG. 1a, the voltage state estimator 12 determines in real-time running the phase voltage status from the dc-bus voltage and the switch states of the phases. The equations for such estimation were given before and are listed again in the following:

$$v_a = sw_a \, v_{dc}$$

$$v_b = sw_b \, v_{dc}$$

$$v_c = sw_c \, v_{dc}$$

where $sw_a = 1$ if $sw\_A1=1$, $sw\_A2=1$;

$sw_a = 0$ if $sw\_A1=1$, $sw\_A2=0$;

$sw_a = -1$ if $sw\_A1=0$, $sw\_A2=0$, $i_a \neq 0$;

$sw_a = 0$ if $sw\_A1=0$, $sw\_A2=0$, $i_a = 0$;

Similar for $sw_b$ and $sw_c$.

Using the estimated voltages the flux calculator 13 integrates for the estimated flux for each phase, as described before. In the interpolation and table look-up block 14 for each phase, the estimated flux is used with the phase current measured values to estimate the reference angle $\theta\gamma^{EST}$ from the magnetization table 2. For each of the three phases separately, the phase flux and phase current combination corresponds to a point in the magnetization table as graphed in FIG. 2b. The point indicates the relative rotor pole position as measured form the complete alignment position or from the complete nonaligned position between the rotor poles and the stator poles of that phase. With such information on the instantaneous rotor pole location relative to the active phase stator poles and the knowledge of the stator and rotor pole numbers, angle $\theta\gamma^{EST}$ can be synthesized for each phase to estimate the rotor position relative to each phase stator poles.

While the present invention has been described with reference to one or more particular embodiment, those skilled in the art will recognize that many changes may be made thereto without departing from the spirit and scope of the present invention, which is set forth in the following claims.

I claim:

1. A universal drive for a switched reluctance machine (SRM), said drive comprising:
   means for automatically storing information pertaining to magnetic flux, current, and rotor angle of said SRM to form a magnetization table;
   means for automatically storing information relating the torque of said SRM to turn-on and turn-off angles to form a rule table;
   a first sensor coupled to said SRM for sensing the currents of the phases of said SRM;
   a second sensor for sensing a dc bus voltage;
   estimation means coupled to said magnetization table for estimating a reference angle using information in said magnetization table and said sensed voltage and currents;
   interpolation means coupled to said rule table for obtaining the turn-on and turn-off angles from said rule table based upon said desired speed; and
   current driving means coupled to said estimation and interpolation means for turning the phase currents of the SRM on at the turn-on angle in relation to the reference angle and turning the phase current off in relation to the reference angle and the turn-off angle.

2. The universal drive of claim 1 wherein said magnetization table and said rule table are generated at drive commissioning.

3. The universal drive of claim 1 wherein said means for storing information for storing magnetic flux, current, and rotor angle uses a microprocessor.

4. The universal drive of claim 1 further comprising means for calculating an estimated rotor speed, said means coupled to said means for estimating the reference angle.

5. The universal drive of claim 4 further comprising feedback means coupled to said coupled to said means for obtaining turn-on and turn-off angles for correcting errors between a desired rotor speed and the estimated rotor speed.

6. A universal drive for a switched reluctance machine said drive obtaining a desired speed, said drive comprising:
   means for creating a magnetization table, said table containing information relating the magnetic flux, current, and rotor angle of said switched reluctance machine, said table automatically generated at drive commissioning;
   means for creating a rule table, said rule table relating the torque of said SRM to turn-on and turn-off angles, said table automatically generated at drive commissioning;
   a first sensor coupled to said SRM for sensing the currents of the phases of said machine;
   a second sensor coupled to said drive for sensing the dc bus voltage;
   estimation means coupled to said magnetization table for estimating a reference angle using information in said magnetization table and said sensed voltage and currents;
   interpolation means coupled to said rule table for obtaining the turn-on and turn-off angles from said rule table based upon said desired speed;
   current driving means coupled to said estimation and interpolation means for turning the phase currents of the machine on at the turn-on angle in relation to the reference angle and turning the phase current off in relation to the reference angle and the turn-off angle;
   means for calculating the estimated rotor speed, said means coupled to said means for estimating the reference angle; and
   feedback means coupled to said coupled to said means for obtaining turn-on and turn-off angles for correcting errors between the desired rotor speed and the estimated rotor speed.

7. A universal drive for a switched reluctance machine (SRM) said drive obtaining a desired speed, said drive comprising:
   means for creating a magnetization table, said table containing information relating the magnetic flux, current, and rotor angle of said switched reluctance machine, said table automatically generated at drive commissioning;

means for creating a rule table, said rule table relating the torque of said SRM to turn-on and turn-off angles, said table automatically generated at drive commissioning;

a first sensor coupled to said SRM for sensing the currents of the phases of said SRM;

a second sensor coupled to said drive for sensing the dc bus voltage;

estimation means coupled to said magnetization table for estimating a reference angle using information in said magnetization table and said sensed voltage and currents;

interpolation means coupled to said rule table for obtaining the turn-on and turn-off angles from said rule table based upon said desired speed;

means for calculating the estimated rotor speed, said means coupled to said means for estimating the reference angle;

feedback means coupled to said coupled to said means for obtaining turn-on and turn-off angles for correcting errors between the desired rotor speed and the estimated rotor speed;

a gating signal generator, coupled to said current driving means, for generating gating signals;

a gate driver coupled to said gating signal generator for providing driver signals; and a power circuit driven by said driver signals and coupled to said gate driver, said power circuit coupled to and driving said switched reluctance machine.

8. A method for driving a switched reluctance machine to a desired speed, said method comprising the steps of:

automatically forming a magnetization table, said table containing information relating the magnetic flux, current, and rotor angle of said switched reluctance machine;

automatically forming a rule table, said rule table relating the torque of said SRM to turn-on and turn-off angles;

sensing the dc bus voltage and currents of the phases of said machine;

estimating a reference angle using information in said magnetization table and said sensed voltage and currents;

obtaining the turn-on and turn-off angles from said rule table based upon said desired speed; and turning the phase currents of the machine on at the turn-on angle in relation to the reference angle and turning the phase current off in relation to the reference angle and the turn-off angle.

9. The method of claim 8 wherein said step for forming the rule table presets a range of the turn-on angle and for all turn-off angles in said range calculates the torque of the machine.

10. The method of claim 8 wherein said step for forming the rule table presets a range of turn-off angles and for all turn on angles within said range calculates the torque of the machine.

11. The method of claim 8 wherein said step for forming the rule table with a constant turn-off angle iterates within a range of turn-on angles.

12. The method of claim 8 wherein said step for forming the rule table with a constant turn-on angle iterates within a range of turn-off angles.

13. A method for driving a switched reluctance machine to a desired speed, said method comprising the steps of:

automatically forming a magnetization table, said table containing information relating the magnetic flux, current, and rotor angle of said switched reluctance machine;

automatically forming a rule table, said rule table relating the torque of said SRM to turn-on and turn-off angles;

sensing the dc bus voltage and currents of the phases of said machine;

estimating a reference angle using information in said magnetization table and said sensed voltage and currents;

obtaining the turn-on and turn-off angles from said rule table based upon said desired speed;

turning the phase currents of the machine on at the turn-on angle in relation to the reference angle and turning the phase current off in relation to the reference angle and the turn-off angle;

calculating the estimated rotor speed, said means coupled to said means for estimating the reference angle;

obtaining turn-on and turn-off angles for correcting errors between the desired rotor speed and the estimated rotor speed;

calculating the estimated rotor speed, said means coupled to said means for estimating the reference angle; and correcting errors between the desired rotor speed and the estimated rotor speed.

14. A method for driving a switched reluctance machine to a desired speed, said method comprising the steps of:

automatically forming a magnetization table, said table containing information relating the magnetic flux, current, and rotor angle of said switched reluctance machine;

automatically forming a rule table, said rule table relating the torque of said SRM to turn-on and turn-off angles;

sensing the dc bus voltage and currents of the phases of said machine;

estimating a reference angle using information in said magnetization table and said sensed voltage and currents;

obtaining the turn-on and turn-off angles from said self-tuned table based upon said desired speed;

turning the phase currents of the machine on at the turn-on angle in relation to the reference angle and turning the phase current off in relation to the reference angle and the turn-off angle;

means for calculating the estimated rotor speed, said means coupled to said means for estimating the reference angle;

obtaining turn-on and turn-off angles for correcting errors between the desired rotor speed and the estimated rotor speed;

calculating the estimated rotor speed, said means coupled to said means for estimating the reference angle; and correcting errors between the desired rotor speed and the estimated rotor speed.

15. A universal drive for a switched reluctance machine (SRM), said drive comprising:

a memory in said drive said memory storing information pertaining to magnetic flux, current, and rotor angle of said SRM to form a magnetization table and information relating the torque of said SRM to turn-on and turn-off angles to form a rule table;

a first sensor coupled to said SRM for sensing the currents of the phases of said SRM;

a second sensor for sensing a dc bus voltage;

estimation means coupled to said memory for estimating a reference angle using information in said magnetization table and said sensed voltage and currents;

interpolation means coupled to said memory for obtaining the turn-on and turn-off angles from said rule table based upon said desired speed; and current driving means coupled to said estimation and interpolation means for turning the phase currents of the SRM on at the turn-on angle in relation to the reference angle and turning the phase current off at the turn-off angle in relation to the reference angle.

16. A circuit for generating a reference angle for use by a switched reluctance machine (SRM), said circuit comprising:

voltage state estimator means, said estimator means receiving a switching signal output from said SRM and a sensed dc-bus voltage, said voltage state estimator means determining phase voltage signals from said switching signal output and said dc-bus voltage;

a flux calculator coupled to said voltage state estimator means for integrating said phase voltage signals and producing signals representing flux linkages;

a magnetization table including information pertaining to magnetic flux, current, and rotor angle of said SRM; and interpolation and table look-up means coupled to said magnetization table and to said flux calculator for determining an estimated rotor angle from said magnetization table based upon said flux linkages and sensed phase currents of said SRM.

17. A circuit for generating gating signals for application to a switched reluctance machine (SRM), said circuit comprising:

a self-tuned rule table, said table including information relating the torque of said SRM to turn-on and turn-off angles;

interpolation and table look-up means for obtaining the turn-on and turn-off angles from said rule table; and a gating signal generator coupled to said interpolation and table look-up means for generating signals based upon said turn-on and turnoff angles and a reference signal.

* * * * *